(12) United States Patent
Bruzzone et al.

(10) Patent No.: US 11,059,135 B1
(45) Date of Patent: Jul. 13, 2021

(54) RECONFIGURABLE MACHINING CENTER

(71) Applicant: Universitá degli Studi di Genova, Genoa (IT)

(72) Inventors: Alessandro Arturo Bruzzone, Genoa (IT); Margherita Monti, Genoa (IT); Andrea Godani, La Spezia (IT)

(*) Notice: Subject to any disclaimer, the term of this patent is extended or adjusted under 35 U.S.C. 154(b) by 559 days.

(21) Appl. No.: 16/076,008

(22) PCT Filed: Feb. 10, 2017

(86) PCT No.: PCT/IB2017/050737
§ 371 (c)(1),
(2) Date: Aug. 7, 2018

(87) PCT Pub. No.: WO2017/137938
PCT Pub. Date: Aug. 17, 2017

(30) Foreign Application Priority Data

Feb. 10, 2016 (IT) .................. 102016000013699

(51) Int. Cl.
*B23Q 37/00* (2006.01)
*B23Q 5/40* (2006.01)
(Continued)

(52) U.S. Cl.
CPC ............... *B23Q 1/44* (2013.01); *B23C 1/002* (2013.01); *B23Q 1/012* (2013.01); *B23Q 1/015* (2013.01);
(Continued)

(58) Field of Classification Search
CPC ...... B23Q 1/46; B23Q 37/007; B23Q 37/005; B23Q 37/00; B23Q 1/01–1/017;
(Continued)

(56) References Cited

U.S. PATENT DOCUMENTS 3,415,138 A * 12/1968 Rumbarger ............. F16H 25/24
74/409
3,431,797 A * 3/1969 Galbarini ............ F16H 25/2409
74/665 GA
(Continued)

FOREIGN PATENT DOCUMENTS

EP           92331 A   * 10/1983
EP         2008764      12/2008
(Continued)

*Primary Examiner* — Erica E Cadugan
(74) *Attorney, Agent, or Firm* — Themis Law

(57) ABSTRACT

A reconfigurable machining center includes a base structure extending in a first direction, a movable crossmember movable in the first direction and provided with a machining head, supporting elements on the base structure to enable movement of the movable crossmember along the first direction, a first leadscrew rack, integral with the base structure and having a first helical circular toothed sector, and extending along the entire base structure parallel to the first direction, and a first screw rotatably coupled to the movable crossmember and engaging a corresponding first leadscrew rack, and having a rotation axis parallel to the first direction. The longitudinal extension of the base structure in the first direction is an integer multiple of the pitch of tooth of the leadscrew racks, and the base structure includes coupling elements adapted to couple the base structure to a following and/or preceding adjacent base structure along the first direction.

16 Claims, 13 Drawing Sheets

(51) Int. Cl.
*B23Q 1/46* (2006.01)
*B23Q 1/01* (2006.01)
*F16H 25/24* (2006.01)
*B23Q 1/44* (2006.01)
*B23C 1/00* (2006.01)
*B23C 1/06* (2006.01)
*B23C 1/08* (2006.01)

(52) U.S. Cl.
CPC ............... *B23Q 1/017* (2013.01); *B23Q 1/46* (2013.01); *B23Q 5/40* (2013.01); *B23Q 37/005* (2013.01); *B23Q 37/007* (2013.01); *B23C 1/06* (2013.01); *B23C 1/08* (2013.01); *Y10T 29/50* (2015.01); *Y10T 409/307952* (2015.01); *Y10T 409/308288* (2015.01); *Y10T 409/309576* (2015.01)

(58) Field of Classification Search
CPC ............. B23Q 5/22–5/50; Y10T 29/50; Y10T 408/91; Y10T 409/307728; Y10T 409/308288; Y10T 406/309576; F16H 25/2409; B23C 1/002; B23B 39/006; B24B 7/005; B23K 37/0235
USPC ............ 29/560; 409/202, 212, 235; 408/234
See application file for complete search history.

(56) References Cited

U.S. PATENT DOCUMENTS

| | | | | |
|---|---|---|---|---|
| 3,720,114 | A * | 3/1973 | Vertin | F16H 25/2409 74/424.6 |
| 3,720,115 | A * | 3/1973 | Vertin | B23Q 5/40 74/424.6 |
| 3,752,596 | A * | 8/1973 | Weyand | F16H 25/2409 409/235 |
| 4,546,531 | A * | 10/1985 | Maleschew | B23Q 1/015 29/560 |
| 5,848,458 | A * | 12/1998 | Bullen | B23Q 41/04 409/212 |
| 5,920,974 | A * | 7/1999 | Bullen | B23Q 41/04 29/33 K |
| 6,920,973 | B2 * | 7/2005 | Koren | B23Q 41/04 29/563 |
| 2006/0288809 | A1 | 12/2006 | Fleytman | |
| 2008/0105158 | A1 * | 5/2008 | Boyl-Davis | B23Q 9/0042 105/29.1 |
| 2013/0039713 | A1 | 2/2013 | Weidman | |
| 2017/0304979 | A1 * | 10/2017 | Hirata | B23Q 41/02 |

FOREIGN PATENT DOCUMENTS

| | | |
|---|---|---|
| FR | 2738520 | 3/1997 |
| GB | 1456023 A * | 11/1976 |
| WO | 2013178377 | 12/2013 |

\* cited by examiner

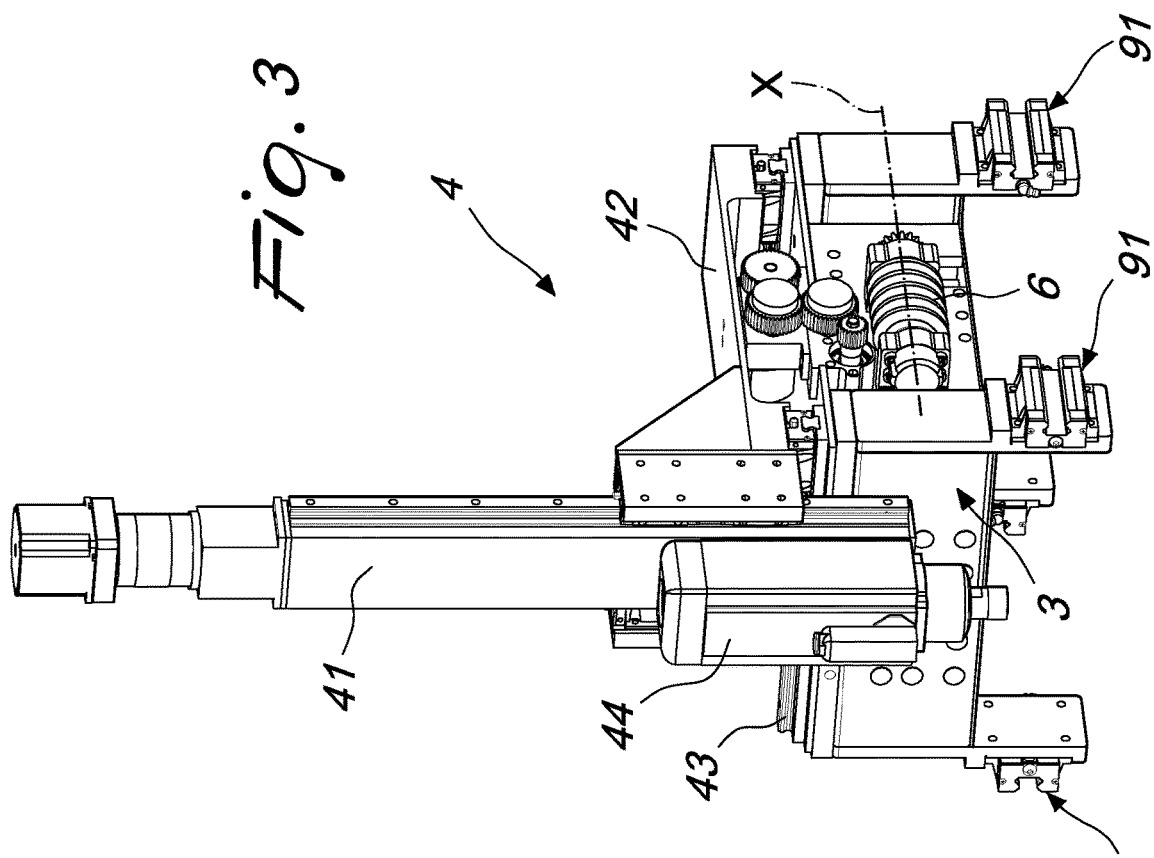
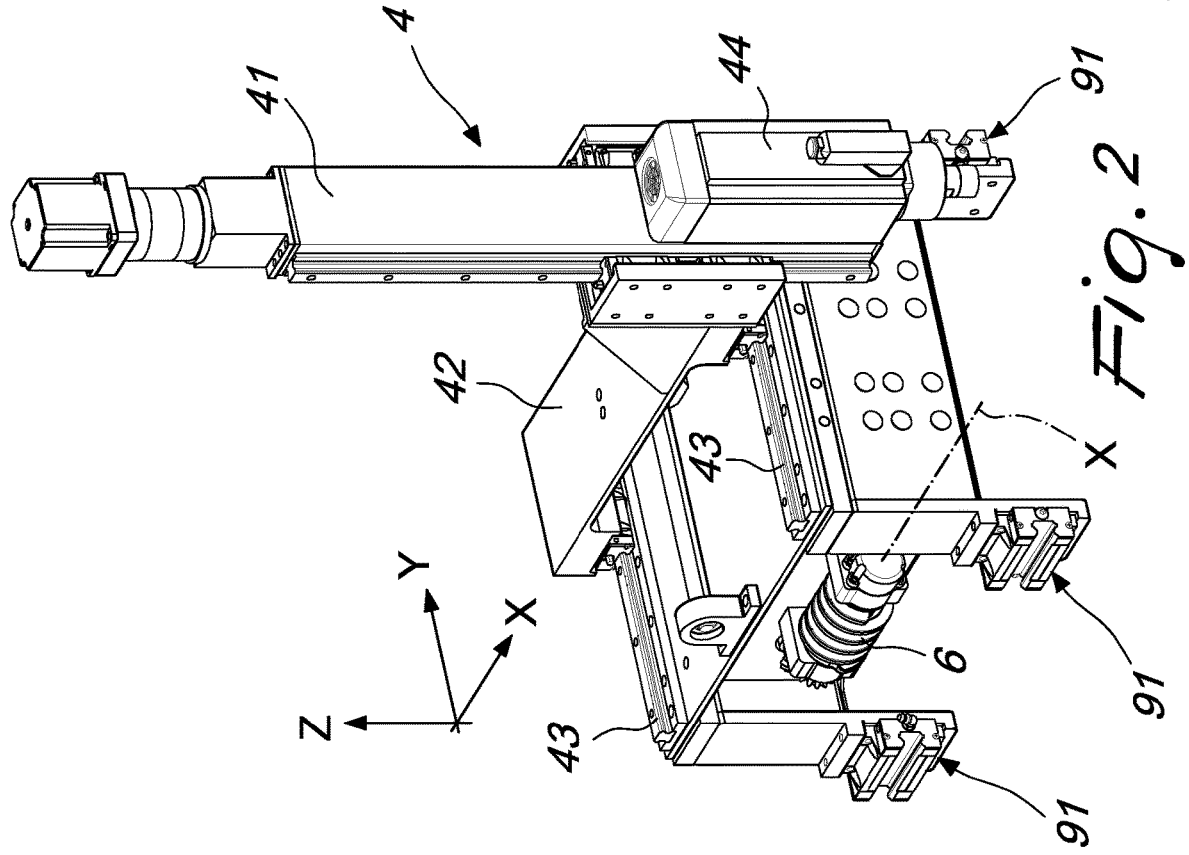

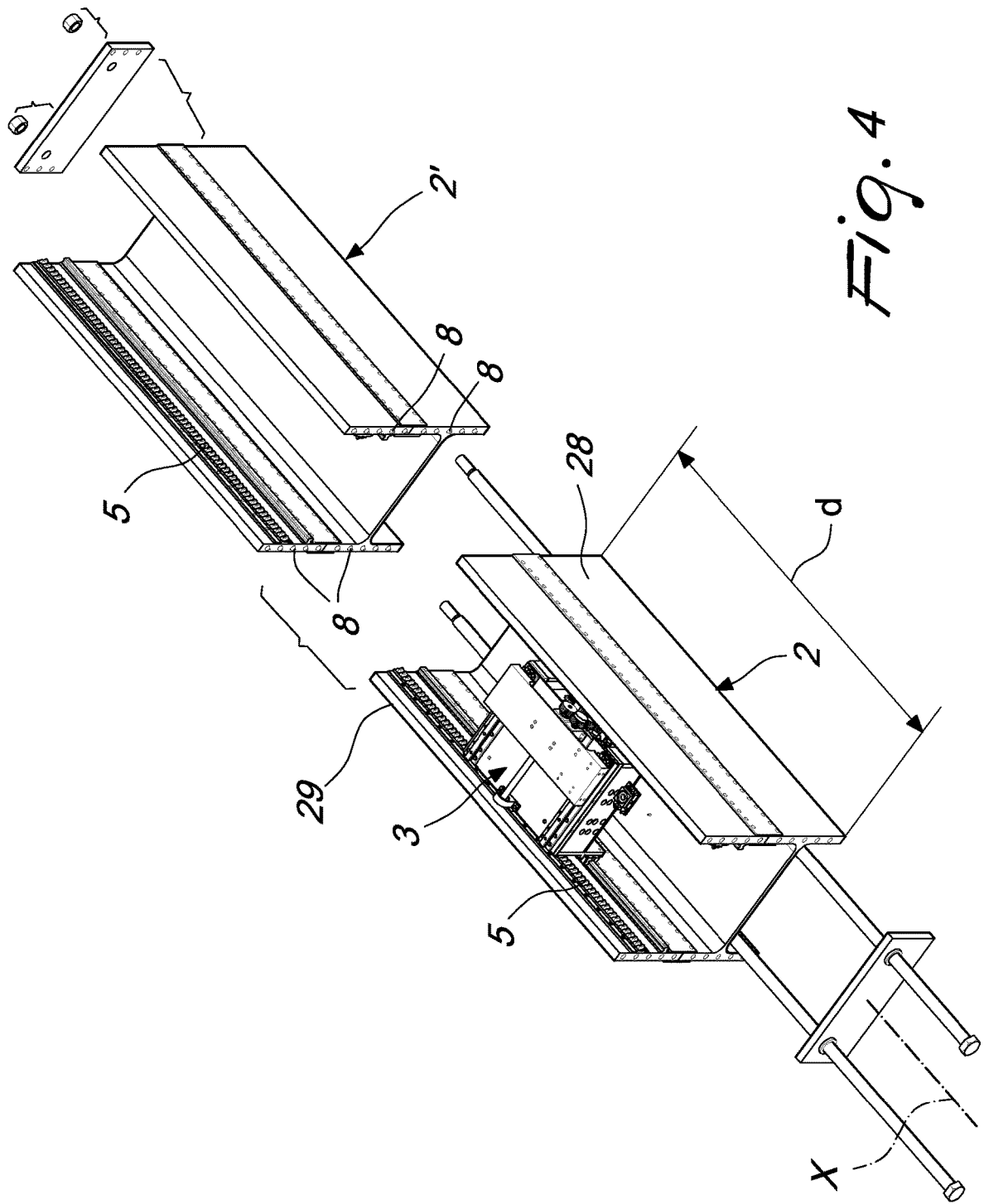

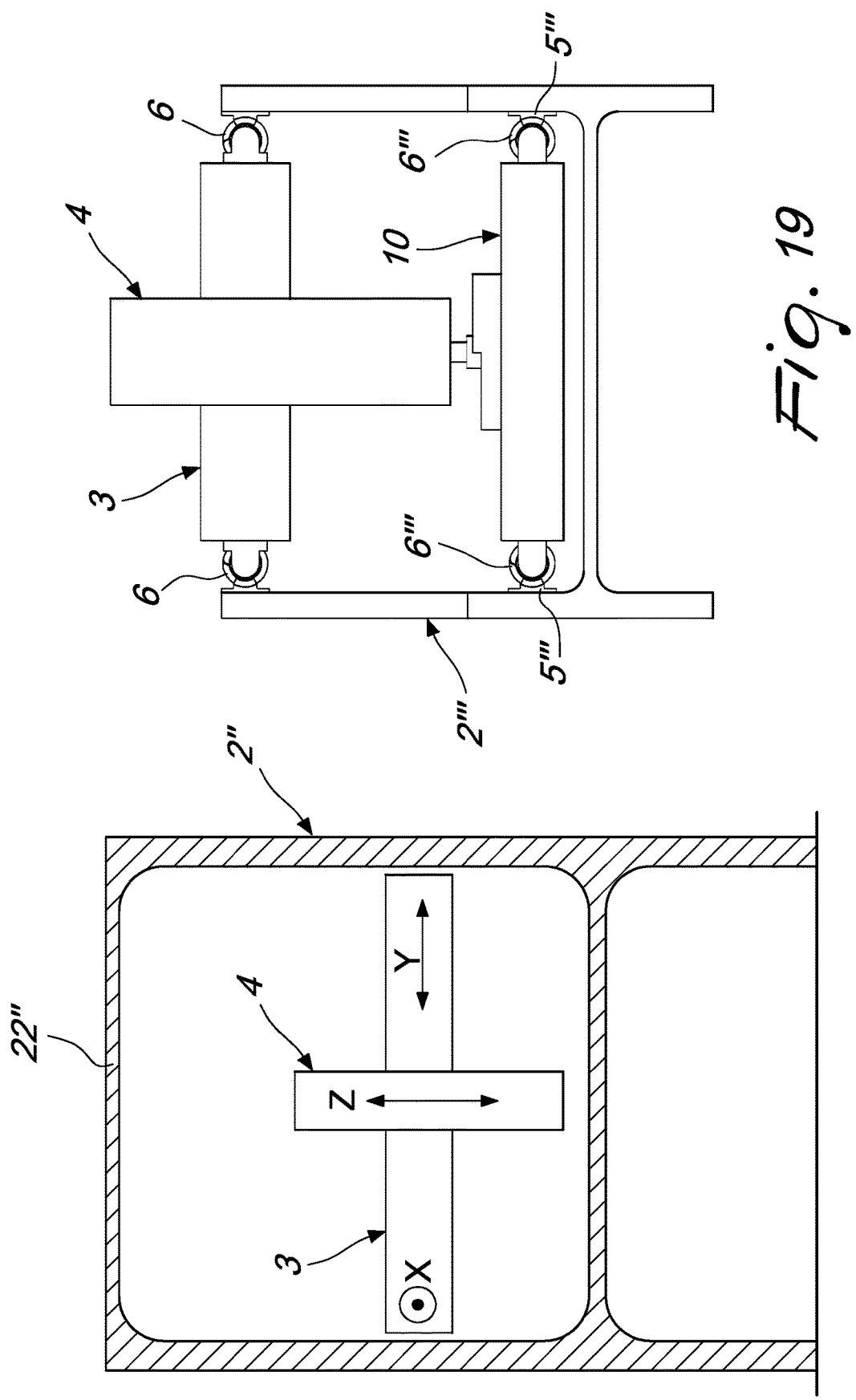

Base Structure Containing At Least Two Electrical Conductors, and Moving Assembly Comprising Sliding Contacts

Fig. 21

Electromagnetic Source for Providing an Electric Power Supply of a Motor Present on the First Movable Crossmember By Way of an Eletromagnetic Field

Fig. 22

RECONFIGURABLE MACHINING CENTER

TECHNICAL FIELD

The present invention relates to the sector of machining technologies and systems.

In particular, the invention relates to a machining center according to the preamble of claim 1.

STATE OF THE ART

In the present invention the term "machining center" is used to mean a system capable of transforming the characteristics of the workpiece by way of operations that can employ subtractive, additive, joining, and plastic deformation processes.

In general a machining center contains the following elements:
- a device that supplies energy, by virtue of which a relative coupled motion is obtained between the tool used to provide the process and the workpiece;
- a device for fixing the workpiece;
- a device for conveniently fixing and orientating a tool;
- a device for controlling the three above mentioned elements;
- a device for operating the tool according to the used transformation process.

Below conventional solutions are described for machining centers constituted by machine tools.

The latter use processes that modify the chemical/physical characteristics of the material being machined such as its geometry or its mechanical characteristics.

Other machining centers, apart from machine tools, are for example centers (or stations) for welding, extrusion, shearing, assembly, measuring and the like.

The characteristics of the machine tool, such as the number and type of axes used for the relative motion between the tool and the workpiece, the dimensions/travel of the axes, and power, determine the production capacities of the machine tool, conditioning the shape (geometry) of the workpieces that can be made (prismatic, rotational), their dimensions, and the geometrical accuracy of the products.

Based on flexibility, machine tools are classified as:
- universal machines (multipurpose), conventional or numerically controlled; these have the greatest flexibility and are adapted to various different kinds of machining.
- automatic machines for manufacturing high production volumes; these require long setup times when the type of production changes.
- special, single-purpose machines; these have no flexibility as they are designed for a certain kind of machining.

Traditionally industry selects the type of machine tools on the basis of the required production volume.

Production capacity increases by transitioning from the universal machines to special machines, at the expense of the variability of the products that can be made.

In order to overcome the limitations connected to flexibility and production capacity, over the last 50 years numerous solutions have been presented, such as flexible manufacturing systems (FMS) which, although they have a greater level of flexibility with respect to dedicated systems (lines with automatic or special machines), have high costs that are not justifiable when the production throughput requires lower production capacities than the rated capacities of the system.

Starting in 1996 at the Engineering Research Center for Reconfigurable Manufacturing Systems (ERC/RMS) of the University of Michigan College of Engineering, the concept of a Reconfigurable Manufacturing System was developed, which is defined as a system "designed at the outset for rapid change in its structure, both for its hardware and software components, in order to quickly adjust its production capacity and functionality within a family of parts in response to sudden changes in the market or in the requirements imposed by regulations".

Reconfigurable Machine Tools (RMTs) are essential to implementing such a system, as they extend the reconfigurability concept from the system (RMS) to the machine tool.

In particular, reconfigurable machine tools have lower costs than numerically controlled machines (CNC, for Computer Numeric Control), since with respect to these they employ a customizable flexibility that is the minimum necessary in order to manufacture products that belong to a given family.

In addition to the customizable flexibility, RMTs should be easily convertible, scalable, and use the same basic structure used in other reconfigurable machines in order to ensure the necessary modularity.

The first example of reconfigurable systems dates back to 1977: in Japan, MITI began the FMC program (Flexible Manufacturing system Complex), which culminated in the construction of an experimental factory in 1983 in Tsukuba.

This study is considered an important reference point because it was the first system that was designed to be modular and variously assemblable according to requirements.

The complex was made up of modular units consisting of machine tools and by assembly robots, with the goal of making a variety of prismatic parts with corresponding packaging.

The modules were stored in a warehouse and assembled according to the product to be made.

Once manufacturing was complete, the modules were disassembled and returned to the warehouse.

Another large-scale project was set up by the European Union in the early 1990s.

On the basis of a report commissioned by the European Community, a survival strategy was formulated for the European machine tool industry.

The report stated that if machine tools are designed and built to be modular, the makers can specialize in providing specific modules instead of complete systems.

Starting from integration modules, it is possible to build the complete system according to the specific user requirements.

Such strategy requires breaking a machine tool down into a set of autonomous functional units provided with plug-and-play interfaces, in order to build up systems according to specific requirements.

In order to achieve this objective, several projects have been carried out or are under development at European level.

The MOSYN (Modular Synthesis of Advanced Machine Tools) project run by the University of Hanover analyzed the specific configurations for customization.

The KERNEL program seeks to develop two different machine tools using modules with identical axes.

The University of Stuttgart's "Special Research Program 467" concentrates on transformable business structures for highly variable mass production and on developing the capacities and functionalities of machine tools so that they can be adapted to sudden changes in the market.

Another project, called MOTION (Modular Technologies for Intelligent Motion Unit with Linear Motor and Axis Control), analyzed the possibility of using identical modules on different machines and addressed the consequent design of the interfaces.

Since 1996, at the Engineering Research Center of Reconfigurable Machining Systems (ERC/RMS), RMS technology has been developed in three main fields:
  reduction of design times of reconfigurable systems;
  design of reconfigurable machines and of the related control systems;
  reduction of ramp-up times.

The ERC/RMS studies the combination of modular machines and controllers, the methods for the analysis and design of the configuration of the systems, for the modeling, for the calibration and the ramp-up of RMS systems.

Another research project developed by Carnegie Mellon University in Pittsburgh, Pa., called Reconfigurable Modular Manipulator System, studies the development of plug-and-play modules that can be assembled in a large number of different configurations in order to adapt the kinematic and dynamic properties of the manipulator to a specific purpose.

In Japan modules have been made with which it is possible to assemble a complete industrial robot.

The problem of modularity and of reconfigurability has also been addressed in the international Intelligent Manufacturing Systems (IMS) project.

Another solution is disclosed in U.S. Pat. No. 6,920,973 in which a multistage manufacturing system is proposed that uses manufacturing cells, each of which is associated with at least one step of the production process. Each cell has a hexagonal shape, giving the system made up by joining multiple units a honeycomb structure.

The cells must be such that the first has to comprise at least one flexible manufacturing station, a second includes at least one reconfigurable production station and a third is provided with at least one reconfigurable inspection machine. The system has to include a series of conveyor apparatuses that enable the transfer of the parts being machined from one station to the others available in the single production cell, and then from one cell to the subsequent cells.

At the global scale, the three major projects dealing with control systems with open architecture are the OSACA project, commissioned by the European Union, with its German successor HUMNOS; the OSEC project in Japan, and the North American OMAC-TEAM project.

The main result of the OSACA project, started in 1992, is the design oriented on the basis of the object to be made and the use of an open architecture for the systems for controlling the machines.

The OMAC project seeks to establish a series of programming interfaces (Application Programming Interfaces, API) that can be used by developer companies to sell products and services for controlling machines for the aerospace and automobile industries.

Finally, the HEDRA (Heterogeneous and Distributed Real-time Architecture) project, sponsored by the EU, and the previously-mentioned MOTION project have sought to develop control systems capable of managing heterogeneous and distributed processes, although this field of research has not yet been fully explored.

Several examples of reconfigurable machine tools have been proposed in the literature and/or claimed in patent applications.

A purely manually-actuated version was proposed by P. O. Aldrin.

This is a universal machine tool provided with a first horizontal worktop on which, by way of an intermediate plate that rotates about a vertical axis, it is possible to mount a second worktable which can be oriented variously with respect to the first one.

The two tables can be moved by way of a leadscrew system.

A vertical column, perpendicular to the base structure, is provided with a second plate that rotates around a horizontal axis and is capable of translating vertically by way of a leadscrew system. A rectangular worktop is mounted on it, on which it is possible to install the rotating base for a motor. The latter enables the actuation of a tool or of a self-centering head used to support the workpiece being machined.

G. N. Bullen, working for the aerospace company Northrop Grumman Corporation, has studied the problem with respect to the production of male and female mold parts in plastic or metal for making parts in composite material, such as material based on fiberglass, graphite or carbon fiber. Such components are used for building aircraft or to obtain life-size models for aerodynamic testing in wind tunnels. It has been observed that using traditional manufacturing techniques to make these dies, which have extremely complex shapes and often also have holes, is very laborious and therefore expensive. The solution proposed by Bullen provides for a reconfigurable machine tool composed of a platform on which a worktable is moved that is translatable and able to rotate between 0° and 90°. A gantry structure allows movement along the X and Y axes of a robotized multiaxis head that carries the tool, constituting the end effector of the Z axis of the machine. The operation is managed by numerical control, with a control panel set on the unit itself. On the workpiece-holding table, the object being machined is kept in position by clamps or by pneumatic devices, both high-precision and re-adaptable according to the dimensions of the workpieces. Single machines then form the modules of an RMS. In fact the ability to rotate the worktop between 0° and 90° makes it possible, at the end of the machining carried out simultaneously by different stations, to join the parts by interlocking and transport them by way of rails to other production cells of the same type, arranged to form an assembly line.

One case that is often cited in the literature relating to reconfigurable machine tools is the Arch-Type RMT, developed at the University of Michigan.

The project started from the need to make cylinder heads for engines with six and eight cylinders, with different inclinations.

The RMT obtained, which was therefore designed to make a specific family of parts, has the spindle installed on an arched movement support that makes it possible to vary the angle of machining and to carry out milling and drilling operations on the parts.

This machine was developed after a first prototype proposed by Y. Koren and S. Kota, which had a base structure, a supporting structure for the castings to be machined, and modules that can be installed on a rail so as to be able to pass from a configuration with two axes to one with three axes.

The model that served as the starting point for the development of the Arch-Type RMT is the one disclosed in the patent filed by the two researchers.

The workpiece to be machined is fixed to the suitable worktop while two arched supporting units allow the movement of at least one single-axis spindle.

In this manner, the spindles, with the tools mounted, can be easily moved by way of numeric control so as to execute the machining operations according to different positions and orientations with respect to the workpiece.

Given the modularity of the machine, the arched supports can be variously arranged, taking advantage of the couplings present on the base structure.

Despite what is recited by the patent just described, the Arch-Type differs from the RMT approach due to the rigidity of its architecture, the lack of modularity and the need for intervention by the operator in order to manually reorient the non-perpendicular axis in the machine in various discrete positions.

There are two other examples of RMTs that do not entail the use of the usual Cartesian reference system.

The first is the Parallel Kinematic Machine (PKM) developed by Z. M. Bi at the University of Indiana. This is a machine with a gantry structure that supports a tripod actuator equipped with three degrees of freedom and with a passive arm. The workpiece-holding table allows the object to be machined to be moved on the X and Y axes of the plane, giving the machine two other degrees of freedom. Finally, the bridge to which the tripod actuator is anchored can be made to rotate about its own axis.

As previously mentioned, although it is more sophisticated in terms of kinematic modeling and of control, by virtue of the modularity of its components a PKM can be easily re-adapted to carry out varieties of machining, even if these are mutually very different.

The second example is represented by the reconfigurable machine tool proposed and patented by J. K. Park and colleagues.

It has a tripod supporting structure raised off the ground, which supports two intersecting circular frames, each one capable of rotating about its own axis. A sliding component is fixed to the two circular frames, in a circumferential position, and a spindle is fixed vertically to it which can therefore be moved and rotated around the workpiece, being thus able to execute three-dimensional machining operations.

For simpler geometries the modularity of this RMT is exploited by using a single circular frame with the sliding carriage block and the spindle mounted on it.

This structure therefore makes it possible to considerably simplify the machine tool which frequently requires up to five axes, becoming very large and complicated, and avoids the problems associated with the vibrations that can arise, traditionally due to the tool which behaves like a cantilevered beam.

X. Chao and colleagues have patented a reconfigurable cutting machine tool. This structure is provided with a base, a module provided with a self-centering head for holding the workpieces, a support for such workpieces and a movable turret capable of carrying a thermal cutting torch which is numerically controlled.

Each module is provided with standardized interfaces that make it possible to reconfigure the machine each time the production strategy or the type of cutting operations to be carried out changes.

The machine tool proposed by S. Ongaro enables the combination of a series of modular units that can work on a same workpiece in a mutually coordinated manner without the necessity of having to reposition it after each operation, as usually happens.

The raw workpiece to be machined is supported by two mutually opposite supporting structures that make it rotate about an axis parallel to the main axis.

The modules provided with spindles and/or tools are moved on their guides which are conveniently brought to and away from the workpiece, making it possible to execute multiple operations simultaneously and independently of each other, such as turning, milling, or gears cutting.

D. P Weidman, H. K. Patel, J. W. Dillman and G. L. Headrick have invented modules that serve as elements that make up the longitudinal axis of a machine tool.

By adding various units in series, it is possible to obtain different configurations according to the particular object that is to be machined.

The extendable axis thus obtained can become the base for a gantry structure or for a transverse axis on which the spindle is mounted in a cantilever fashion.

The movement of the transverse body of the machine is ensured by way of recirculating ball or leadscrew systems.

To conclude, it is mentioned the bench-mounted numerically controlled reconfigurable machine tool patented by L. Kui and colleagues.

It is constituted by a series of modules that comprise a base structure, lathe headstock and tailstock, a column support, the spindle box and a storage area for spindles and tools.

By having the possibility to variously organize the basic units that make up the machine so that they can execute very diversified turning and milling operations, the costs of machining operations carried out on objects of small dimensions can be kept down.

Various different systems of moving an axis to produce linear motion, by way of devices constituted by recirculating-ball or rack-and-leadscrew systems, have been claimed by several inventors.

For example, although constituting a valid example of an RMT, the patent proposed by D. P. Weidman and colleagues adopts a conventional recirculating-ball leadscrew coupling, with the leadscrew fixed to the supports of the crossbeam while the screw, actuated by a motor, is arranged in the recess present in the modules.

This solution, although valid, is affected by the constraint represented by the necessity of having maneuvering screws of different length in function of the useful travel that it is desired to give the machine.

Examples of machine tools that use the mating of an endless screw with a rack can be found in some planer machines produced between the end of the nineteenth century and the start of the twentieth century by the American company William Sellers & Co.

In the various different versions of such machine tools, there was a screw with multiple starts that engaged on the rack installed under the workpiece-holding table of the planer; the whole was designed so that six teeth of the rack were always engaged with the screw. The system for transmission of power from the motor to the shaft of the screw was designed to ensure the correct engagement of the screw on the teeth.

However, in these cases the screw is inclined with respect to the female thread with consequent reactions directed along the axis of the screw.

An arrangement with the two elements, screw and rack, mutually aligned can be found for example in large parallel lathes for longitudinally moving the first saddle of the tool-holder block. In such configuration the length of the rack is preset, and it reacts to only the forces directed along the longitudinal axis, the other components of the forces generated during the cutting being supported by the two parallel guides.

The reconfigurable machine tools offered today have predefined work volumes, and modifying these requires complex interventions such as the substitution of some components: for example if the travel of a linear axis is increased, the leadscrew system requires at least the substitution of the screw with another of greater length.

From all the foregoing it evidently follows that, although they are to a certain degree effective, the machining centers currently available have a number of drawbacks.

OBJECTS AND SUMMARY OF THE INVENTION

The aim of the present invention is to overcome the drawbacks of the background art.

Within this aim, an object of the present invention is to make it possible to modify the dimension of the travel length of at least one linear axis of machining centers, in particular of reconfigurable machine tools, without requiring complex interventions such as the substitution of components that already are part of the machine to be modified.

Another object of the present invention is to be able to vary the number of tools/devices that machine the workpiece without requiring a modification of the elements (spindles, extrusion heads etc.) that already operate on the machining center, in particular a machine tool.

Another object of the invention is to obtain a system that is easily modifiable without the intervention of specialist labor or complex technologies.

This aim and these and other objects which will become better apparent hereinafter are achieved by a machining center, in particular a machine tool, according to the present invention.

The general idea underlying the present invention is to provide a reconfigurable machining center that comprises:
- a base structure which extends longitudinally in a first direction,
- a first movable crossmember which is supported so that it can move with respect to the base structure in the first direction and is provided with an equipped machining head,
- supporting elements for supporting the movable crossmember on the base structure so that it can move along the first direction,
- a first leadscrew rack, integral with the base structure, which comprises a first helical circular toothed sector, the leadscrew rack extending along the base structure in a longitudinal direction parallel to the first direction for the entire extension of the base structure in the first direction,
- a first screw rotationally coupled to the movable crossmember by way of a moving assembly, the screw engaging with the corresponding first leadscrew rack, the screw having its rotation axis parallel to the first direction, wherein the longitudinal extension of the base structure in the first direction is an integer multiple of the pitch of the teeth of the leadscrew racks, and wherein the base structure further comprises elements for coupling that are adapted to couple the base structure to a following and/or preceding adjacent base structure, along the first direction.

According to an optional and advantageous characteristic, taken alone or in combination with the foregoing characteristics, the base structure comprises a second leadscrew rack parallel to the first leadscrew rack, the second leadscrew rack comprising a second helical circular toothed sector with the same pitch of teeth of the first leadscrew rack or a multiple thereof, the leadscrew rack extending along the base structure in a longitudinal direction parallel to the first direction for the entire extension of the base structure in the first direction, and the machining center comprises a second screw rotationally coupled to the movable crossmember by way of a moving assembly, the second screw engaging with the corresponding second leadscrew rack, the second screw having its rotation axis parallel to the first direction, wherein the first and the second screw define a same pair of screws.

According to an optional and advantageous characteristic, taken alone or in combination with the foregoing characteristics, the supporting elements for supporting the movable crossmember on the base structure so that it can move along the first direction comprise bearings cooperating with rails.

According to an optional and advantageous characteristic, taken alone or in combination with the foregoing characteristics, the supporting elements for supporting the movable crossmember on the base structure so that it can move along the first direction comprise the first and/or the second leadscrew rack.

According to an optional and advantageous characteristic, taken alone or in combination with the foregoing characteristics, the moving assembly is single for the first and the second screw of a same pair of screws and comprises a motor and a transmission shaft that is common to the first and to the second screw of the same pair, each screw being coupled to the shaft, so that the two screws of the same pair rotate synchronously.

According to an optional and advantageous characteristic, taken alone or in combination with the foregoing characteristics, the equipped machining head can move with respect to the crossmember in a second direction, perpendicular with respect to the first direction, a first plane on which the first and the second directions lie preferably being a horizontal plane when the machining center is operating.

According to an optional and advantageous characteristic, taken alone or in combination with the foregoing characteristics, the equipped machining head comprises a tool-holder that can move with respect to the equipped head in a third direction, perpendicular to the first plane.

According to an optional and advantageous characteristic, taken alone or in combination with the foregoing characteristics, the helical circular toothed sector of the first and/or the second leadscrew rack is defined by a center angle of amplitude comprised between 30° and 90°, so that the first and/or the second leadscrew rack have a function of moving the movable crossmember with respect to the base structure.

Alternatively, according to an optional and advantageous characteristic, taken alone or in combination with the foregoing characteristics, the helical circular toothed sector of the first and/or the second leadscrew rack is defined by a center angle of amplitude comprised between 90° and 300°, so that the first and/or the second leadscrew rack have a function of moving and supporting the movable crossmember with respect to the base structure, thus constituting at least part of the supporting elements.

According to an optional and advantageous characteristic, taken alone or in combination with the foregoing characteristics, the machining center comprises a workpiece-holding table arranged parallel to the movable crossmember and supported so that it can move on the base structure along a direction parallel to the first direction.

According to an optional and advantageous characteristic, taken alone or in combination with the foregoing characteristics, the base structure comprises a first leadscrew rack of the workpiece-holding table integral with the base structure, comprising a first helical circular toothed sector, the first leadscrew rack of the workpiece-holding table extending along the base structure in a longitudinal direction parallel to the first direction for the entire extension of the base structure in the first direction and wherein the workpiece-holding table comprises a first screw of the workpiece-holding table rotationally coupled to the workpiece-holding table by way of a moving assembly, the first screw of the workpiece-holding table engaging with the corresponding first leadscrew rack of the workpiece-holding table, the first screw of the workpiece-holding table having its rotation axis parallel to the first direction.

According to an optional and advantageous characteristic, taken alone or in combination with the foregoing characteristics, the base structure comprises a second leadscrew rack of the workpiece-holding table integral with the base structure, comprising a second helical circular toothed sector, the second leadscrew rack of the workpiece-holding table extending along the base structure in a longitudinal direction parallel to the first direction for the entire extension of the base structure in the first direction and wherein the workpiece-holding table comprises a second screw of the workpiece-holding table rotationally coupled to the workpiece-holding table by way of a moving assembly, the second screw of the workpiece-holding table engaging with the corresponding second leadscrew rack of the workpiece-holding table, the second screw of the workpiece-holding table having its rotation axis parallel to the first direction.

According to an optional and advantageous characteristic, taken alone or in combination with the foregoing characteristics, the machining center comprises an additional base structure that extends longitudinally in the first direction, comprising a first and/or a second leadscrew rack of the additional base structure, which are integral with the additional base structure and identical to the first and/or second leadscrew rack of the base structure, wherein the first and/or second leadscrew rack of the additional base structure extend along the additional base structure in a longitudinal direction parallel to the first direction for the entire extension of the additional base structure in the first direction, wherein the longitudinal extension of the additional base structure in the first direction is a multiple of the pitch of the teeth of the leadscrew racks, and wherein, when the base structure and the additional base structure are coupled, the first and/or the second leadscrew rack of the additional base structure are aligned and contiguous with the first and/or the second leadscrew rack of the base structure, so as to enable a modular coupling of a plurality of base structures all extending in the first direction in such a way as to allow the movement of the screws between the base structures.

According to an optional and advantageous characteristic, taken alone or in combination with the foregoing characteristics, the base structure furthermore contains at least two electric conductors, and preferably the electric conductors are in the form of electric tracks and the moving assembly comprises sliding contacts.

According to an optional and advantageous characteristic, taken alone or in combination with the foregoing characteristics, the machining center comprises an electromagnetic source for the electric power supply of the motors present on the crossmembers by way of an electromagnetic field.

Further advantageous characteristics are the subject of the appended claims, which should be understood to be an integral part of the present description and of the detailed description below.

BRIEF DESCRIPTION OF THE DRAWINGS

The invention will be described below with reference to non-limiting examples, provided for explanatory and non-limiting purposes in the accompanying drawings. These drawings show different aspects and embodiments of the invention and, where appropriate, reference numerals designating similar structures, components, materials and/or elements in different figures are designated by similar reference numerals.

In the accompanying figures:

FIGS. 2 and 3 are two perspective views from different angles of an equipped crossmember of the machining center according to the invention;

FIG. 4 is an exploded perspective view of part of the machining center of FIG. 1 and of a modular extension of the base structure according to the present invention;

FIG. 18 is a schematic cross-sectional view of another variation of the machining center according to the invention;

FIG. 21 schematically depicts features of an embodiment of the machining center: and FIG. 22 schematically depicts features of an embodiment of the machining center.

DETAILED DESCRIPTION OF THE INVENTION

Figure 1:
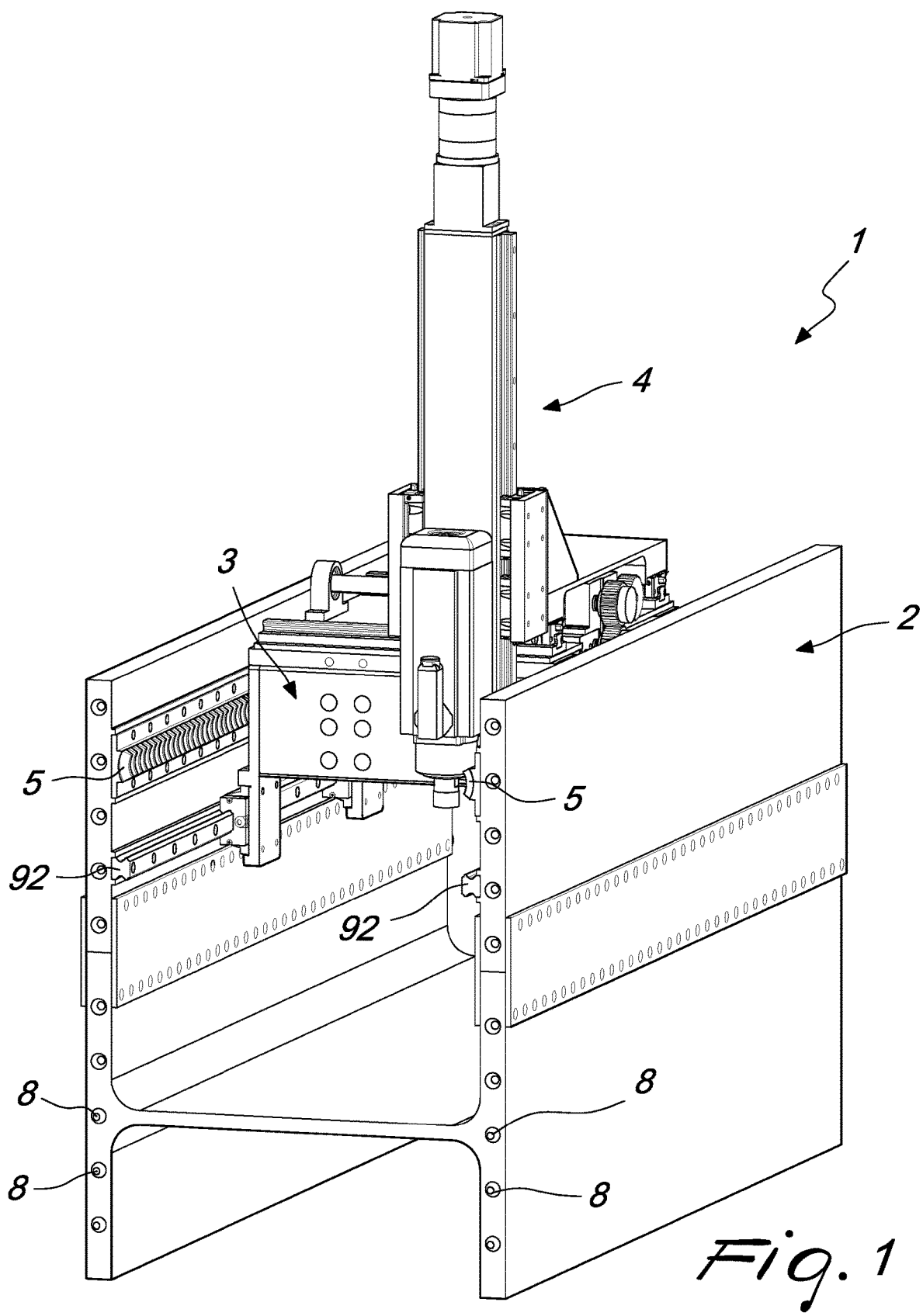
FIG. 1 is a perspective view of an example of a machining center according to the invention.
Figure 5:
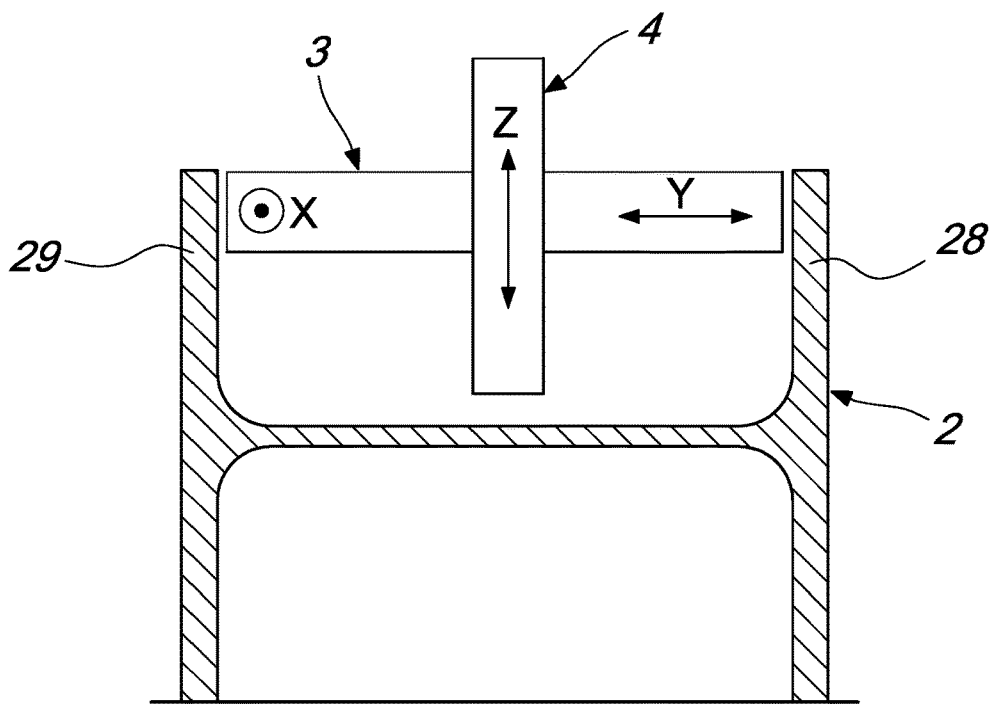
FIG. 5 is a schematic cross-sectional view of the machining center of FIG. 1.
Figure 6:
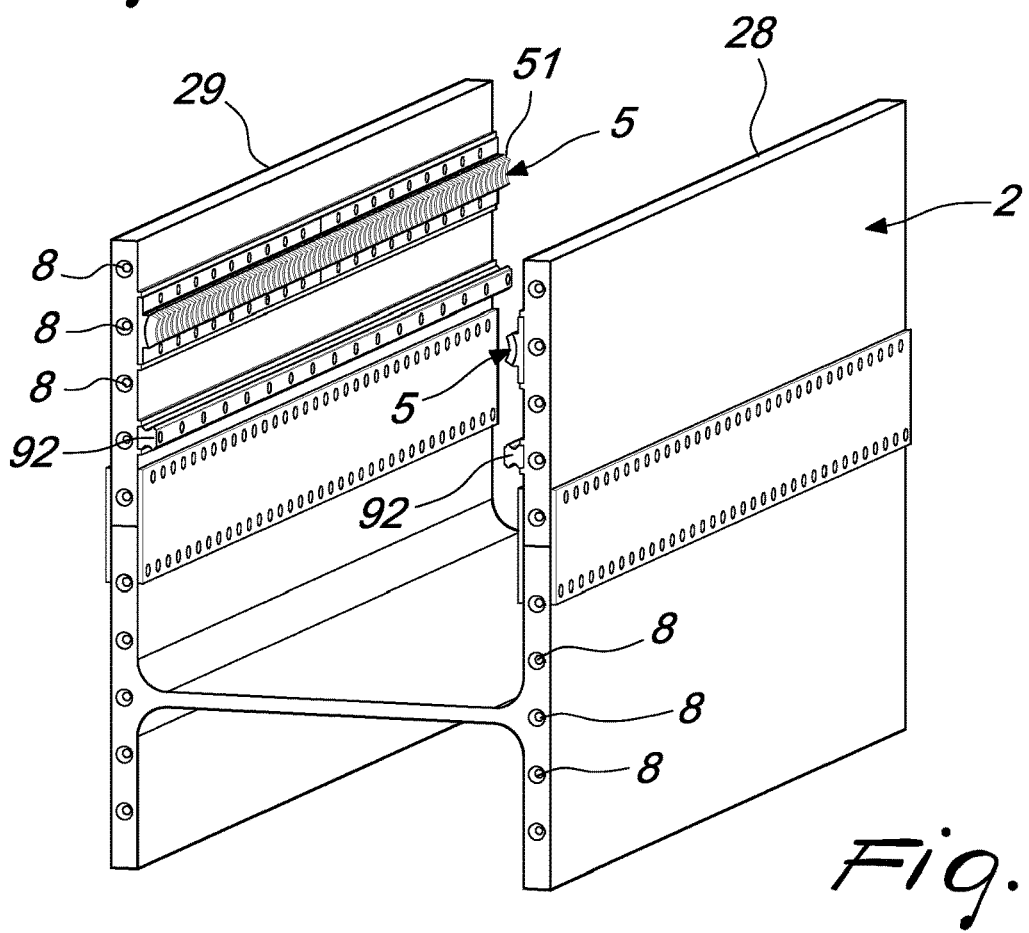
FIG. 6 is a perspective view of the base structure of the machining center of FIG. 1.
Figure 7:
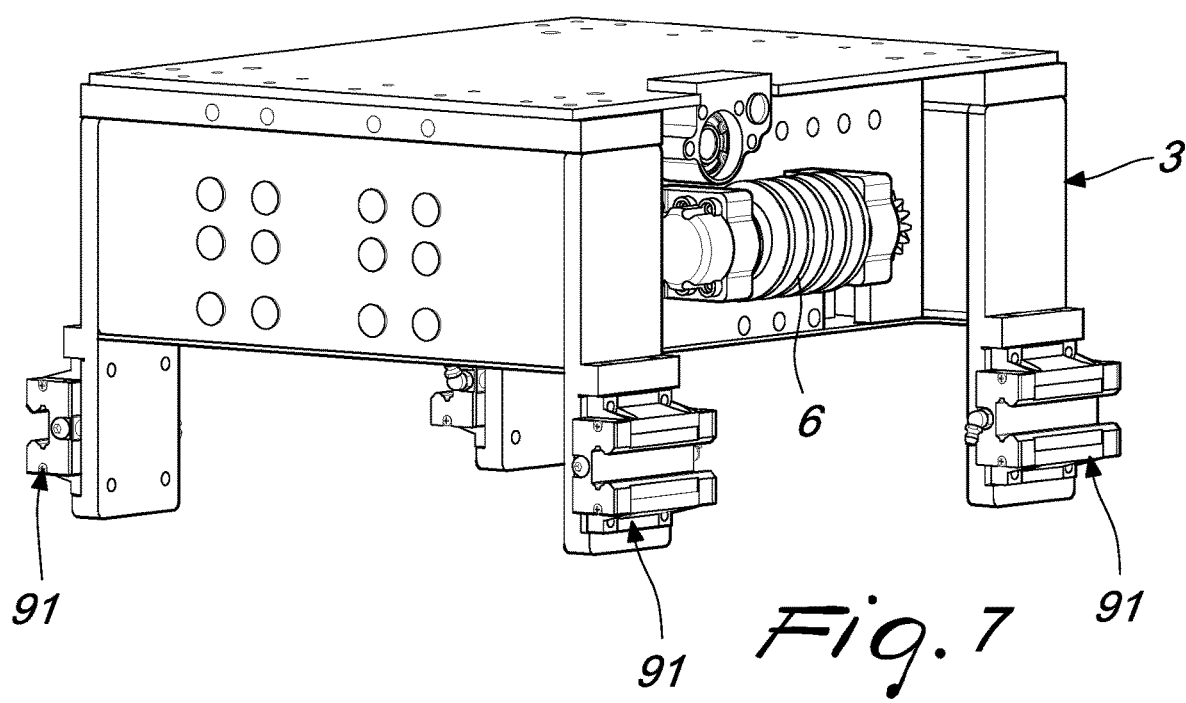
FIGS. 7 and 8 are two perspective views from different angles of a non-equipped movable crossmember of the machining center of FIG. 1.
Figure 8:
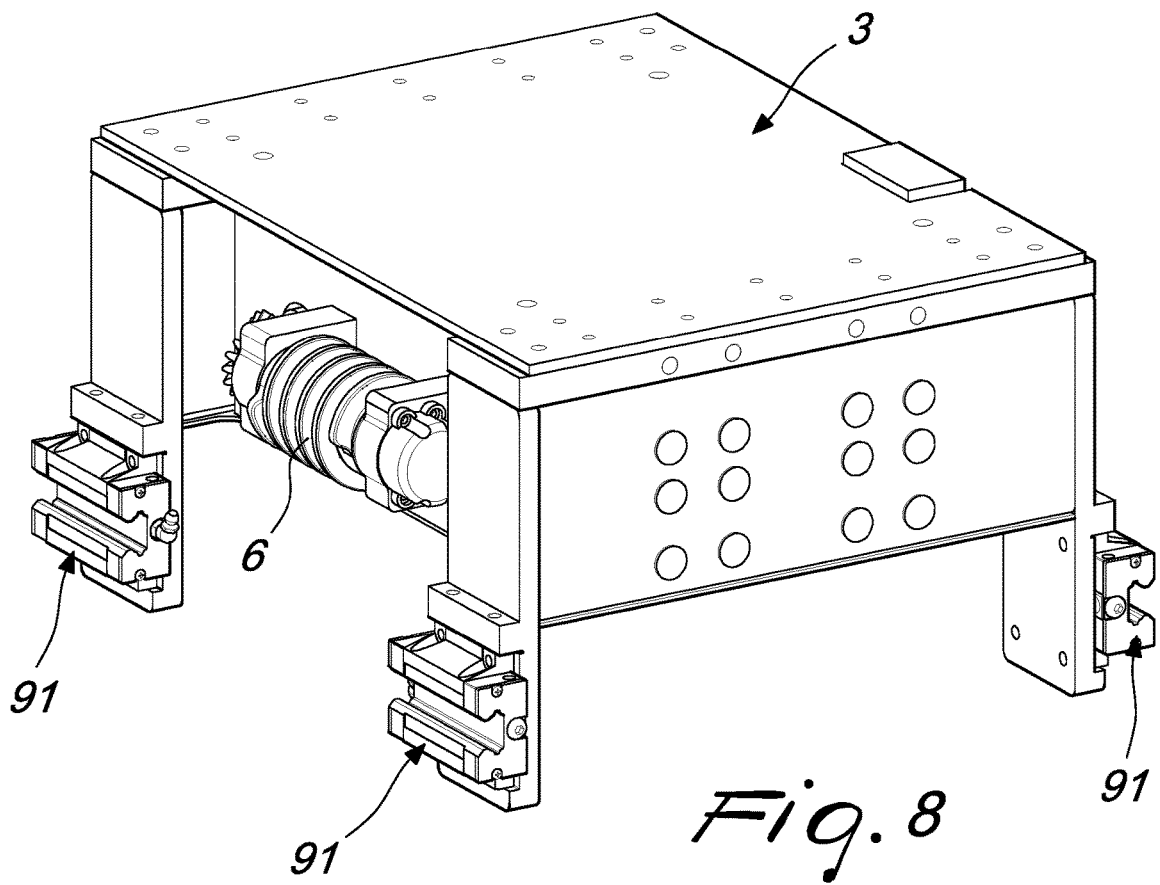
Figure 9:
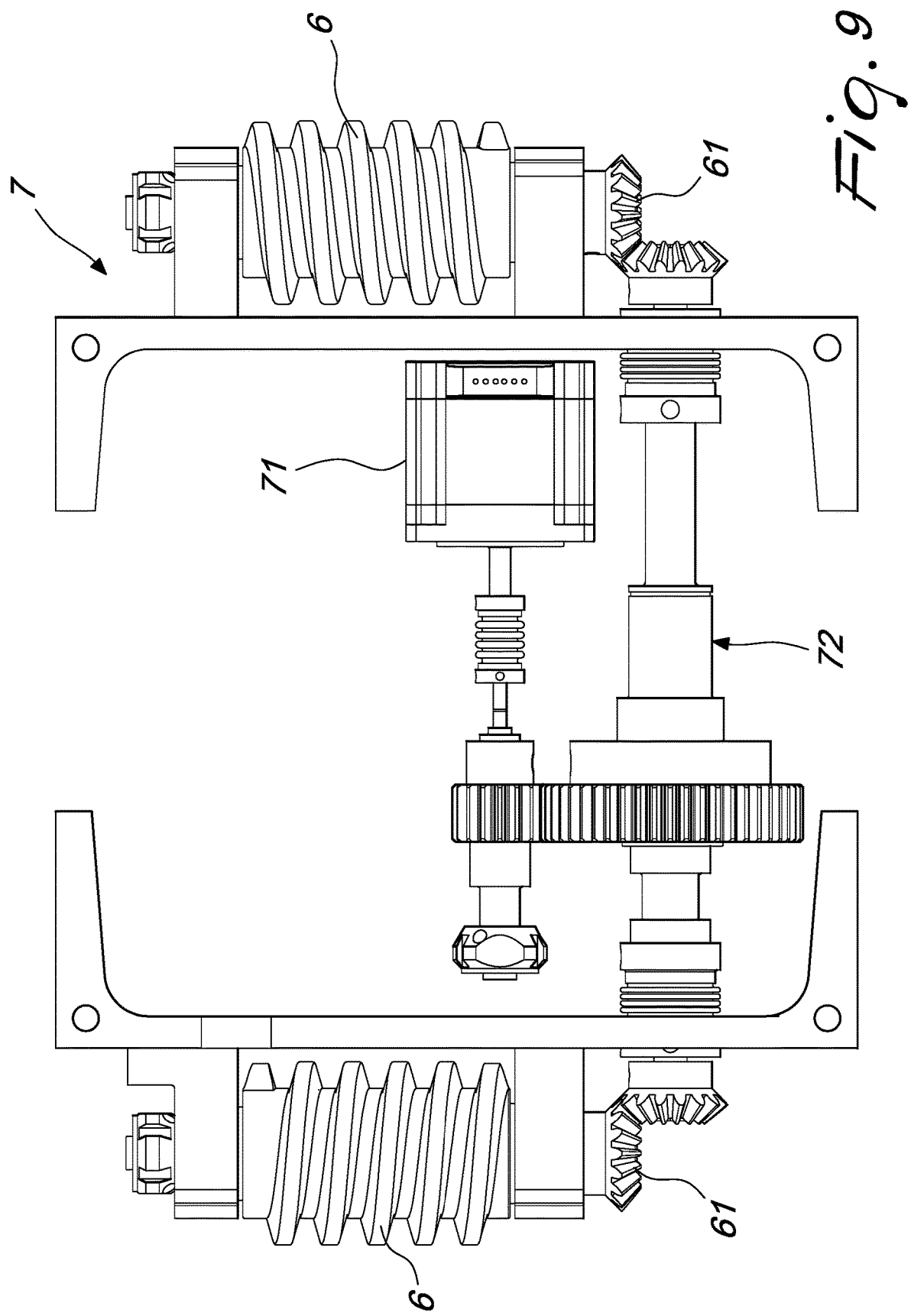
FIG. 9 is a simplified cross-sectional view of the assembly for moving the screws, with the screws of the machining center of FIG. 1 mounted.
Figure 10:
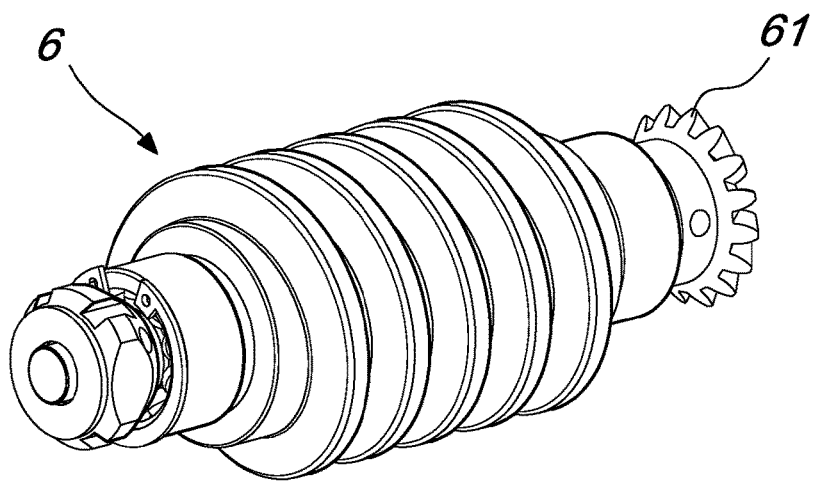
FIG. 10 is a perspective view of a screw of the machining center of FIG. 1.
Figure 11:
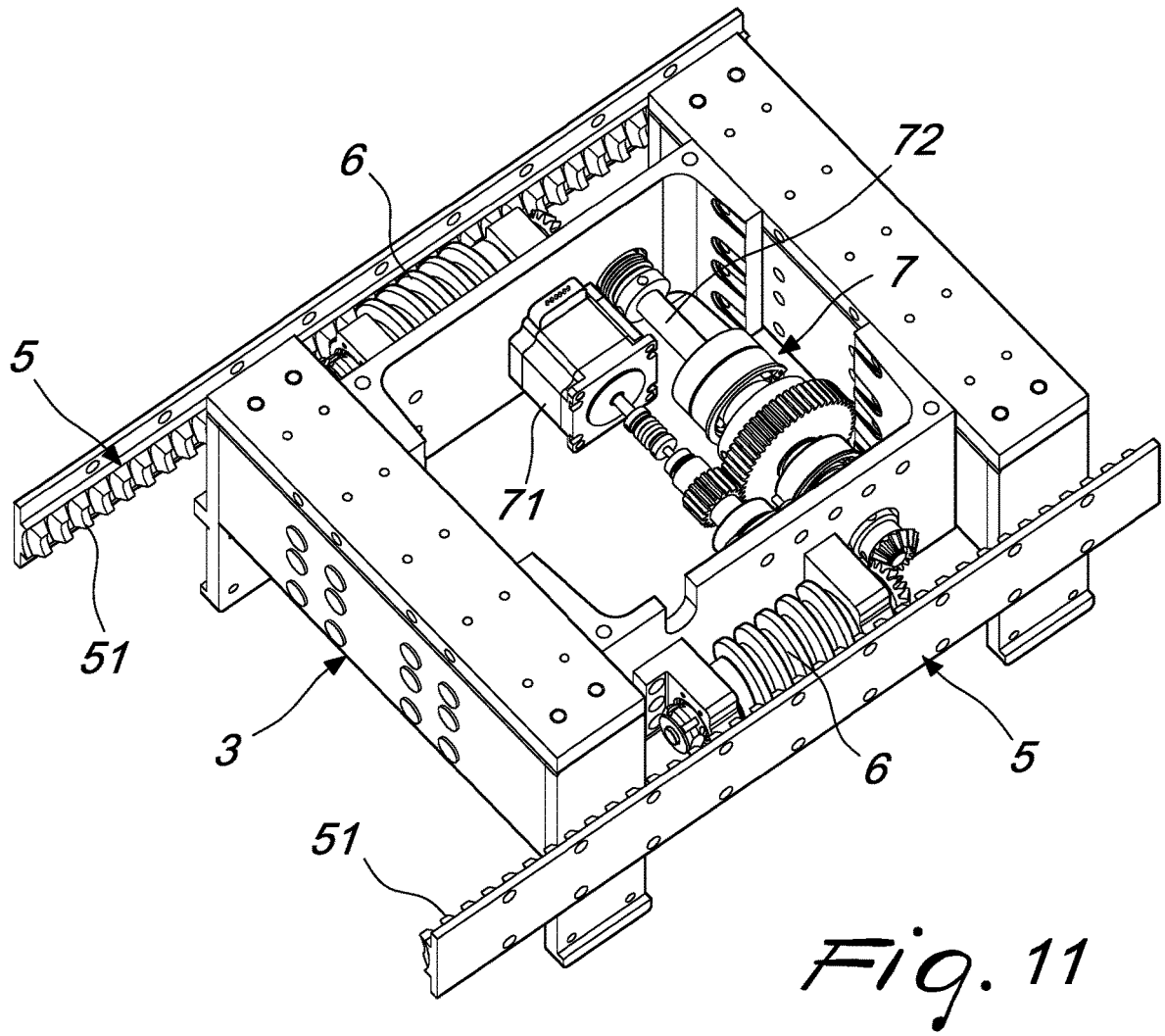
FIG. 11 is a perspective view of the simplified cross-section of the moving assembly of FIG. 9 with the screws engaged in the leadscrew seats.
Figure 12:
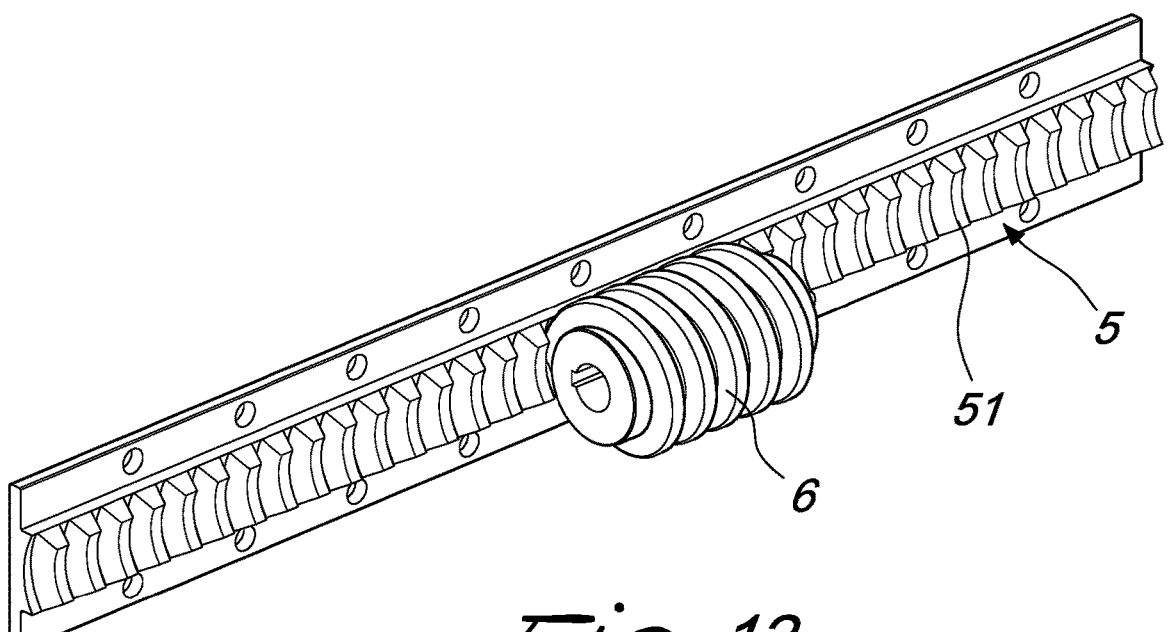
FIGS. 12 and 13 are respectively a perspective view and a transverse cross-sectional view of the coupling between a screw and an open leadscrew of the machining center of FIG. 1.
Figure 13:
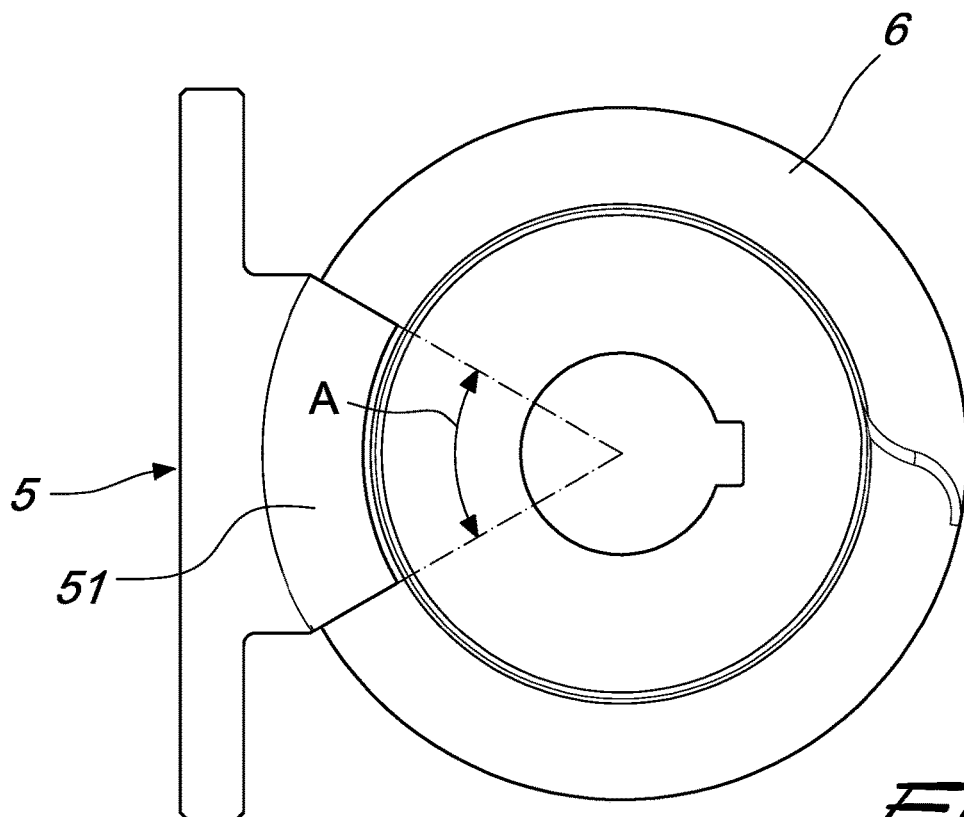
Figure 14:
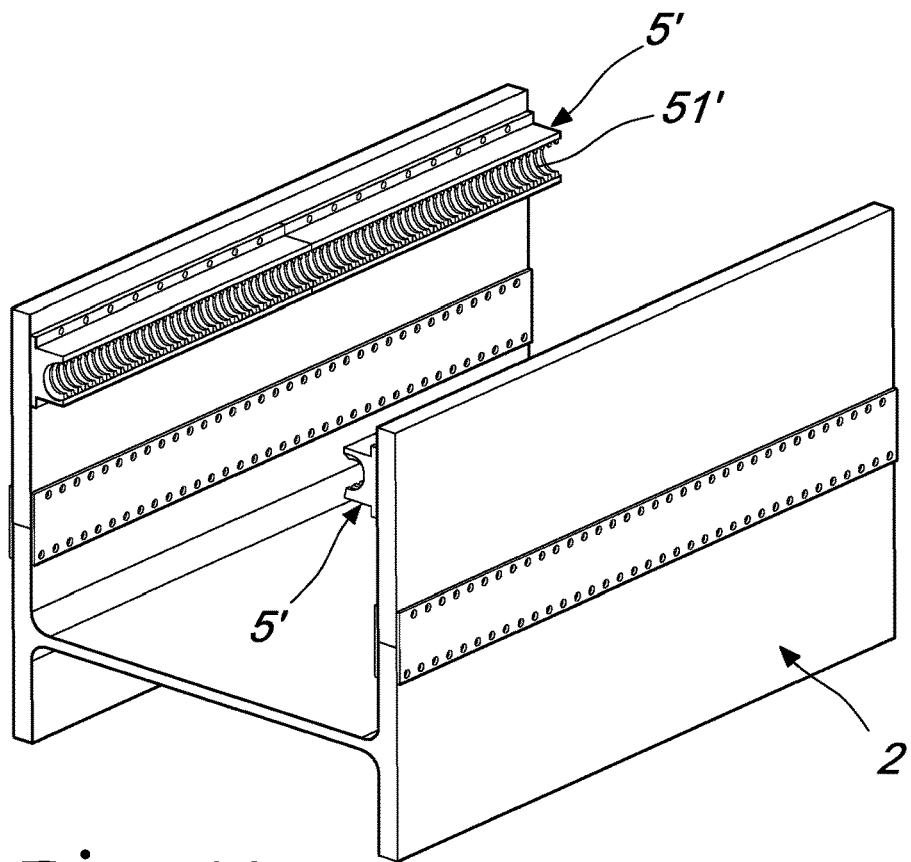
FIG. 14 is a perspective view of a variation of the base structure of the machining center according to the invention.

Although the invention is susceptible of various changes and alternative constructions, some preferred embodiments are shown in the drawings and will be described below in detail.

It should be understood, however, that there is no intention of limiting the invention to the specific embodiment shown, but, on the contrary, it is intended to cover all the changes, alternative and equivalents constructions, that fall within the scope of the invention as defined in the claims.

The use of "for example", "etc.", and "or" indicates non-exclusive alternatives without limitation, unless specified otherwise.

The use of "includes" means "includes, but not limited to", unless specified otherwise.

Indications such as "vertical" and "horizontal", "upper" and "lower" (in the absence of other indications) must be read with reference to the assembly (or operating) conditions and with reference to the normal terminology in use in the current language, where "vertical" indicates a direction that is substantially parallel to that of the force of gravity vector "g" and "horizontal" a direction perpendicular thereto.

With reference to FIGS. 1-13, a machining center according to the invention, generally designated with the reference numeral 1 is generally and in detail shown.

The machining center 1 comprises a base structure 2 which extends longitudinally in a first direction X.

Such base structure 2 is preferably made of metal and has a substantially H-shaped transverse cross-section with respect to the direction X, in this embodiment.

Other transverse cross-sections are possible, but all have at least two parallel and mutually spaced apart vertical wings, 28, 29, which extend from the ground.

The base structure 2, generally speaking, comprises a first leadscrew rack 5, integral with the base structure 2, which comprises a first helical circular toothed sector 51, the leadscrew rack 5 extending along the base structure 2 in a longitudinal direction parallel to the first direction X for the entire extension of the base structure in the first direction X.

The base structure in the embodiment shown for the purposes of example in FIGS. 1-13 also comprises a second leadscrew rack 5, parallel to the first.

Similarly, the second leadscrew rack 5 comprises a second helical circular toothed sector 51 with a pitch of teeth preferably equal to that of the first leadscrew rack or in an integer ratio with the pitch of the first rack. Also similarly, the second leadscrew rack 5 extends along the base structure 2 in a longitudinal direction parallel to the first direction X for the entire extension of the base structure in the first direction X.

With reference to the base structure 2, this has a longitudinal extension d (in the first direction X) which is an integer multiple of the pitch of teeth of the leadscrew racks 5.

Since each rack 5 is as long as the base structure 2, it immediately follows from this that the racks 5 also have a length (in the direction X) that is equal to a multiple of the pitch of teeth of the leadscrew racks.

By "pitch of teeth" what is meant, as is customary in the technical field, is the distance between two homologous points of two adjacent teeth of the helical thread measured along the longitudinal axis (X axis).

By multiple, what is meant is preferably an integer multiple.

In this manner, when two base structures 2, 2' provided as just described (as in FIG. 4) are placed side by side (one preceding and one following along the direction X), the leadscrew racks 5 of the two base structures will have no interruptions in the helical thread at the point of mutual mating, so that they behave overall as a single thread without discontinuities in the interface area of the two base structures.

The base structure 2 further comprises coupling elements 8 that are suitable to couple the base structure 2 to an adjacent additional base structure 2', following and/or preceding, along the first direction X.

Such coupling elements 8 are preferably conical seats provided on one end side of the base structure 2 and complementary conical protrusions provided on the opposite end side of the base structure 2.

In this manner, two adjacent base structures 2, 2' can be connected relatively rapidly and precisely, since the conical seats and protrusions perform a self-centering function, which ensures that the racks of the two base structures are aligned.

We will return to the second base structure 2' later.

The machining center 1 further comprises a first movable crossmember 3 which is supported so that it can move with respect to the base structure 2 in the first direction X and is provided with an equipped machining head 4.

To this end, there are supporting elements for supporting the movable crossmember 3 on the base structure 2 so that it can move along the first direction X, and we will return to these elements later.

The machining center 1 further comprises a first screw 6 rotationally coupled to the movable crossmember 3 by way of a moving assembly 7.

The screw 6 has a helical threading adapted to cooperate with the rack 5.

Preferably the helical thread of the screw 6 is trapezoidal, but it could also be of a different type.

The screw 6 engages in fact with the corresponding leadscrew rack 5 and has a rotation axis parallel to the first direction X.

In the embodiment shown, there is also a second screw 6, parallel to the first and rotationally coupled to the movable crossmember 3 by way of a moving assembly 7.

In other embodiments (not shown) the second screw 6 (and therefore the second rack) is absent and/or substituted by a sliding bearing, for example a rail/slider coupling or the like.

If it is present, the second screw 6 engages with the corresponding second leadscrew rack 5.

The second screw 6 has its rotation axis parallel to the first direction X and (therefore) parallel to that of the first screw 6, so that the first and the second screw 6 can be considered as belonging to the same pair.

Therefore, the movable crossmember 3 moves in the direction X (both ways) along the base structure 2 or 2' by virtue of the action of the screws 6 on the leadscrew racks 5.

From the foregoing description, it follows that a machining center is provided that is extremely versatile, the length of which in the direction X can be extended at will, it being sufficient merely to add, relatively simply and inexpensively, a number of additional base structures to the initial base structure.

Likewise, it follows that, owing to such length that can be modified at will, there can be a plurality of crossmembers 3 with equipped head 4 which operate on the same base structure.

With regard to the equipped head 4, it preferably can move with respect to the crossmember 3 in a second direction Y perpendicular with respect to the first direction X.

To this end the equipped head 4 is coupled to the crossmember 3 by way of sliding bearing rails 43 adapted to enable the movement of the head 4 in the direction Y.

In this sense, it is possible for the plane on which the first direction X and the second direction Y lie to be a horizontal plane (when the machining center is operational or installed in an operational position).

Preferably, also, the equipped machining head 4 comprises a tool-holder 44 that can move with respect to the equipped head 4 in a third direction Z, perpendicular to the first plane.

To this end, the equipped head 4 comprises a frame 42 on which a supporting column 41 is mounted, along which the tool-holder 44 in turn performs a translational motion in the direction Z, which, in the example provided and illustrated, is a vertical direction.

In some embodiments, the tool-holder 44 is designed to support and move a milling tool, while in other embodiments it is a measurement tool, an extrusion head, a turning tool, a cutting and/or welding head, or the like.

Moving on now to describe the supporting elements for supporting the movable crossmember 3 on the base structure 2 so that it can move along the first direction X, in the embodiment shown in FIGS. 1-13, such elements comprise bearings 91 cooperating with rails 92.

In the example, the bearings 91 are coupled to the crossmember 3 and the rails 92 are coupled to the base structure 2, parallel to the leadscrew racks 5 and suitably spaced apart from them; in other embodiments the positions of the bearings 91 and the rails 92 are reciprocated (bearings 91 on the base structure 2 and rails 92 on the crossmember 3).

In an alternative embodiment, shown in FIGS. 14-17, the supporting elements for supporting the movable crossmember 3 on the base structure comprise (or, in a variation, are constituted only by) the first and/or the second leadscrew rack 5'.

In the first case, i.e. when there are dedicated supporting elements (e.g. bearings and rails or the like), the helical circular toothed sector 51 of the leadscrew racks 5 is defined by a center angle A (see FIG. 13) which can be of amplitude comprised between 30° and 90°: in this case in fact the only function of the first and/or the second leadscrew rack 5 is to move the movable crossmember 3 with respect to the base structure 2.

In the second case, however, i.e. when dedicated supporting elements are absent or when, although present, it is considered that at least some of the functionality for supporting the crossmember 3 should be borne by the leadscrew racks 5', it is necessary that the helical circular toothed sector 51' of the leadscrew racks 5' is capable of exercising such additional function, and it is therefore advantageous to define it with a center angle B (see FIG. 17) of amplitude comprised between 90° and 300°.

In this way the first and/or the second leadscrew rack 5' have, in addition to the movement function, the function of supporting the movable crossmember 3 with respect to the base structure 2, thus constituting at least part of such supporting elements.

Figure 15:
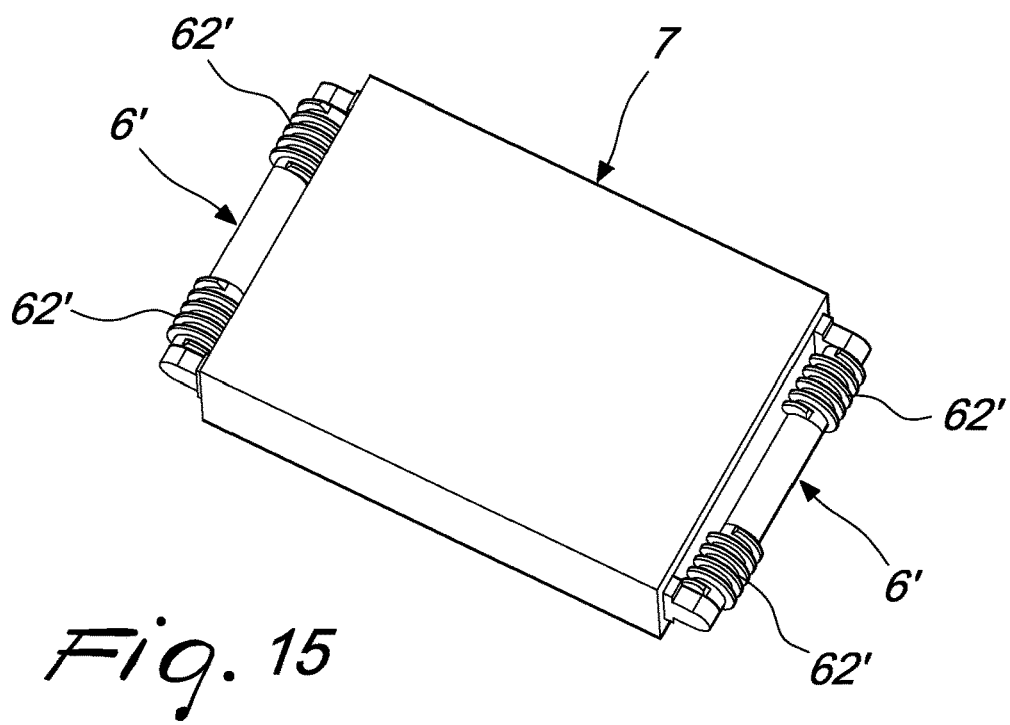
FIG. 15 is a view of a variation of the assembly for moving the screws with a variation of the screws that are applicable to a variation of the base structure of the machining center according to the invention.
Figure 16:
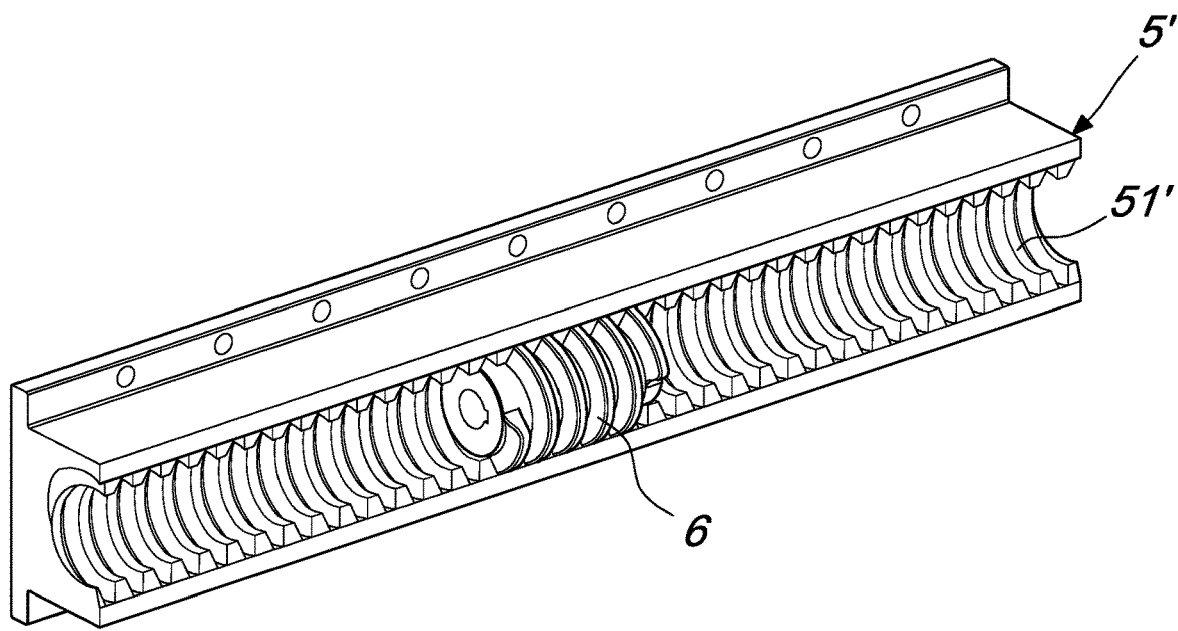
FIGS. 16 and 17 are respectively a perspective view and a transverse cross-sectional view of the coupling between a variation of the screw and a variation of the open leadscrews that are applicable to a variation of the base structure of the machining center according to the invention.
Figure 17:
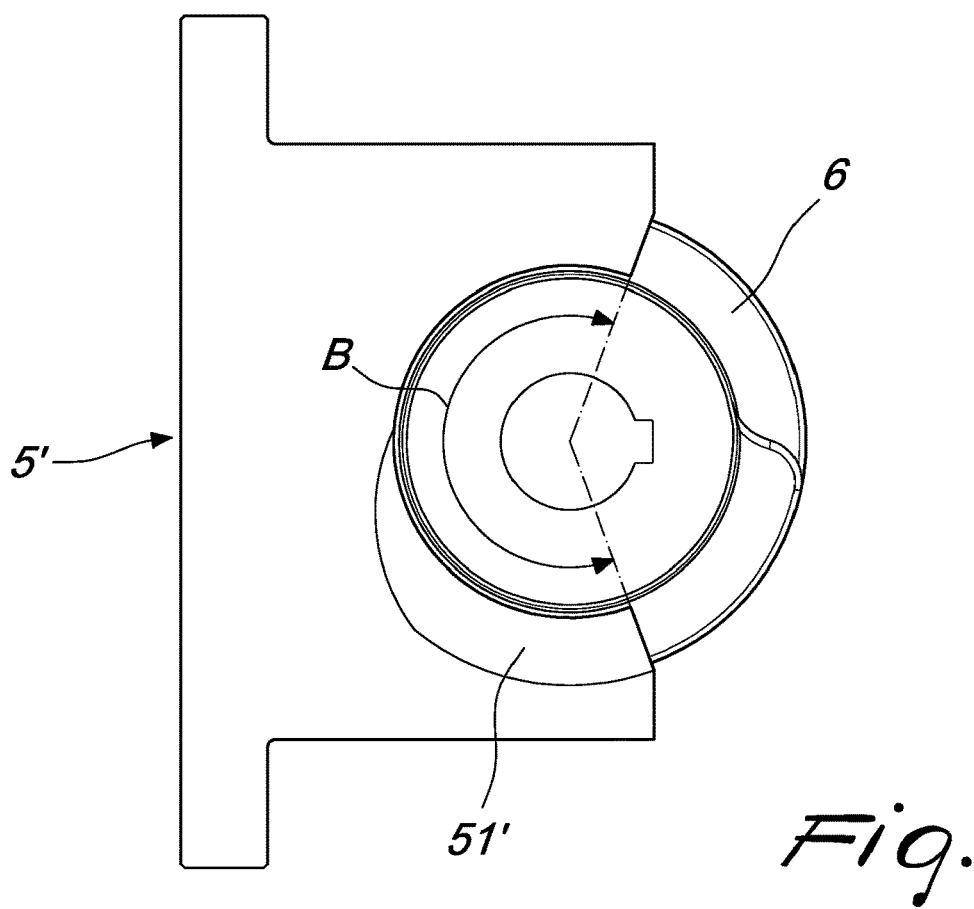

In some variations, as shown in FIG. 15, the screw or screws 6' have an intermediate portion in which the helical threading is absent, for example in order to reduce friction, and only the end portions 62' of the screw 6' are threaded.

As regards the motion imparted to the screws 6, 6', which enables the movement of the crossmember 3 in the direction X, it is obtained by way of a moving assembly 7, which generally comprises at least one motor means coupled to the screw 6, 6'.

In the preferred and illustrated embodiment, there is one moving assembly 7 for the first and the second screw 6 or 6' of a same pair of screws.

The moving assembly 7 is accommodated on the movable crossmember 3 and connected to both of the screws.

In the preferred embodiment, it comprises a motor 71 and a common transmission shaft 72 for the first and the second screw 6 of the same pair. Each screw 6 is therefore coupled to the shaft 72, for example by way of bevel gears 61, so that the two screws 6 or 6' of the same pair rotate synchronously, thus ensuring a steady traction in the movement of the crossmember 3.

The motor 71 is preferably an electric motor, and to power it the base structure comprises at least two isolated electric conductors (shown schematically in FIG. 21).

Preferably such conductors are in the form of electric tracks and the assembly 7 comprises sliding contacts to electrically power the motor 71.

Alternatively, the machining center comprises an electromagnetic source for the electric power supply of the motors present on the crossmembers by way of an electromagnetic field.

Moving on now to other variations of the invention, in one of these, shown in brief in FIG. 19, the machining center 1 also comprises a workpiece-holding table 10 arranged parallel to the movable crossmember 3 and supported so that it can move on the base structure 2 along a direction parallel to the first direction X.

To this end the base structure 2 comprises preferably a first leadscrew rack of the workpiece-holding table 5''' integral with the base structure 2.

Similarly to the foregoing, the first leadscrew rack of the workpiece-holding table 5''' comprises a first helical circular toothed sector, the leadscrew rack of the workpiece-holding table 5''' extending along the base structure 2 in a longitudinal direction parallel to the first direction X preferably for the entire extension of the base structure in the first direction X.

Similarly, the workpiece-holding table 10 comprises a first screw of the workpiece-holding table 6''' rotationally coupled to the workpiece-holding table 10 by way of a moving assembly (not shown but similar to the assembly 7 described above).

The first screw of the workpiece-holding table 6''' has its rotation axis parallel to the first direction X and engages with the corresponding first leadscrew rack of the workpiece-holding table 5''', so as to move the workpiece-holding table in a manner similar to what is described above with reference to the crossmember.

In some solutions a single screw/rack is sufficient to move the workpiece-holding table 10 along the direction X.

In other solutions (as in the example shown), the base structure 2 instead can comprise a second leadscrew rack of the workpiece-holding table 5''' integral with the base structure 2.

Such second leadscrew rack of the workpiece-holding table 5''' comprises a second helical circular toothed sector.

The second leadscrew rack of the workpiece-holding table 5''' also extends along the base structure 2 in a longitudinal direction parallel to the first direction X, preferably for the entire extension of the base structure in the first direction X.

The workpiece-holding table 10 similarly comprises a second screw of the workpiece-holding table 6''' rotationally coupled to the workpiece-holding table 10 by way of a moving assembly, the second screw of the workpiece-holding table 6''' engaging with the corresponding second leadscrew rack of the workpiece-holding table 5''', the second screw of the workpiece-holding table 6''' having its rotation axis parallel to the first direction X.

Returning to FIG. 4, a basic modular implementation is shown, in which the machining center 1 comprises an additional base structure 2' that extends longitudinally in the first direction X, and comprises in turn a first and/or a second leadscrew rack 5 of the additional base structure, integral with the additional base structure 2' and identical to the first and/or second leadscrew rack 5 of the base structure 2.

The first and/or the second leadscrew rack 5 of the additional base structure 2' extend along the latter in a longitudinal direction parallel to the first direction X for the entire extension of the additional base structure in the first direction X.

The longitudinal extension of the additional base structure 2' in the first direction is, as for the base structure 2, a multiple of the pitch of teeth of the leadscrew racks 5, so as to provide the coupling advantages described above.

When a base structure 2 and an additional base structure 2' are coupled, in fact, the first and/or the second leadscrew rack 5 of the additional base structure are aligned and contiguous with the first and/or second leadscrew rack 5 of the base structure 2, so as to enable a modular coupling of a plurality of base structures 2, 2' which extend in the first direction X.

Figure 20:
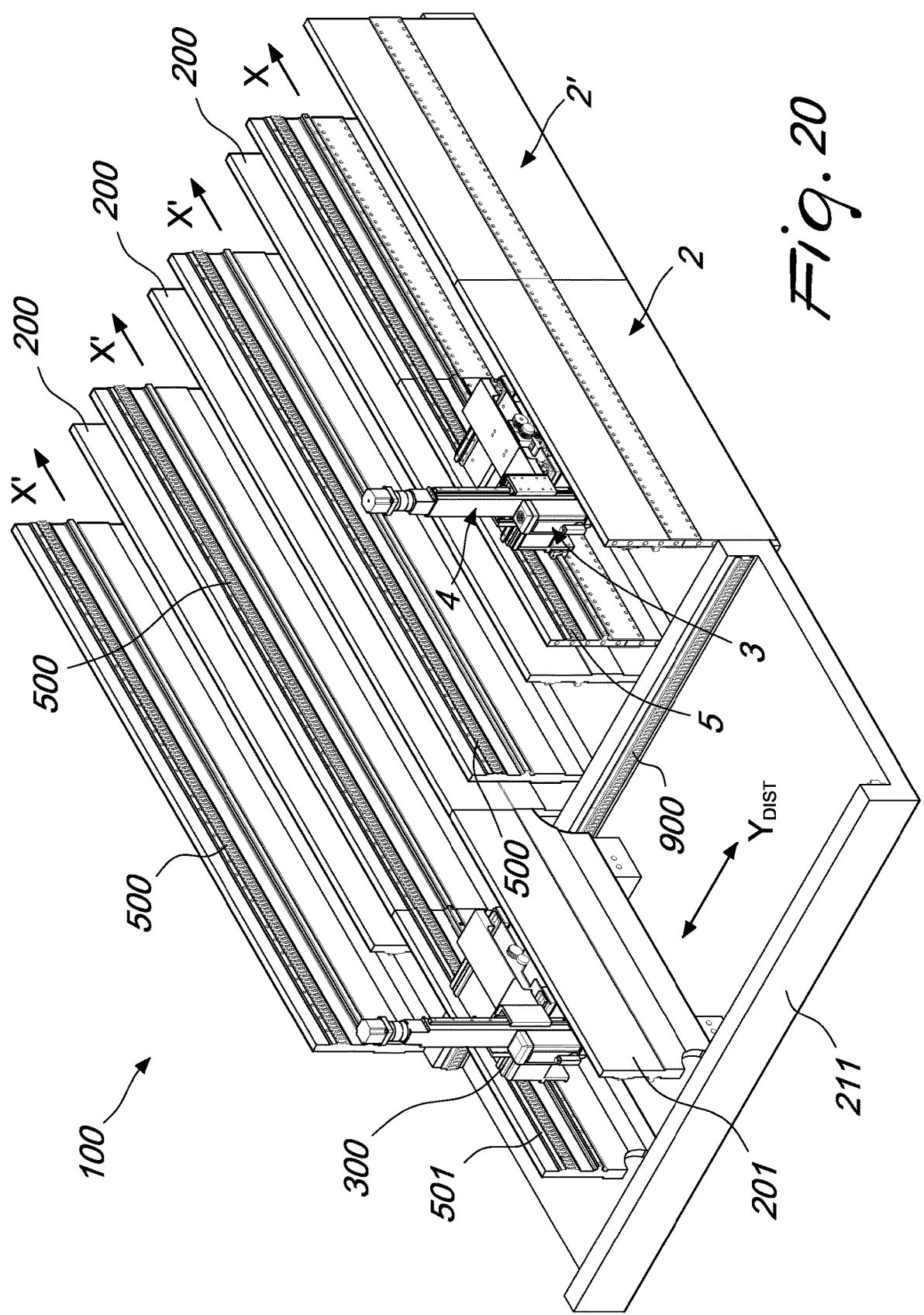
FIG. 20 is a perspective view of an advanced embodiment of the machining center according to the invention.

In an advanced embodiment of FIG. 20, the machining center 100 further comprises an additional base structure 200 that extends longitudinally in a respective first direction X' parallel to the first direction X of the first base structure 2.

In the embodiment shown in FIG. 20 the machining center 100 comprises (but is not limited to) three additional base structures 200, but there may also be only one, two, or more.

The additional base structure 200 is provided in a similar manner to the base structure 2 described earlier.

In particular the additional base structure 200 comprises a respective leadscrew rack 500 which is integral with the additional base structure 200, and which comprises a respective helical circular toothed sector.

The leadscrew rack 500 of the additional base structure 200 is extended along the latter in a respective longitudinal direction parallel to the first direction X substantially for the entire extension of the additional base structure 200 in the respective first direction X', thus being parallel and co-planar with the rack 5 and with any other racks 500 of other additional base structure 200 that are optionally present.

In practice the base structure 2 and the additional base structure or base structures 200 are substantially mutually parallel; on this point it is emphasized that the additional base structure 200 can comprise, in some embodiments, the same characteristics described above for the base structure 2 and about which we will say no more for the sake of brevity.

The pitch of teeth of the leadscrew rack 500 of the additional base structure 200 is also identical to the pitch of teeth of the leadscrew rack 5 of the base structure 2, so that a crossmember 3, 300 that moves on the base structure 2 can also move on the additional base structure 200 in the same way.

Similarly, the longitudinal extension of the additional base structure 200 in the respective first direction X' is an integer multiple of the pitch of teeth of the leadscrew racks 5, 500, so as to enable a modularity of additional base structures that can be extended along the axis X' indefinitely, similarly to what happens for the base structure 2.

In order to allow the transfer at least of the crossmember 3, 300 from one base structure 2 to an additional base structure 200 (or between additional base structures 200), in this embodiment 100 there is at least one distribution base structure 201, which is provided with dedicated leadscrew racks 501.

The distribution base structure 201 can move with respect to the base structure 2 (and therefore with respect to the base structures 200) in a distribution direction (Ydist) which is perpendicular with respect to the first direction (X) (and therefore with respect to the directions X').

To this end the machining center 100 comprises transverse distribution tracks 900 mounted on a transverse distribution base structure 211, which extend perpendicular to the base structures 2, 200, and means for moving the distribution base structure 201 along the distribution tracks 900, for example an electric motor and an adapted kinematic chain (not shown).

In the embodiment shown, the distribution tracks 900 comprise a rack with helical thread and a cooperating screw, in a manner similar to that described above.

The distribution tracks 900 and the corresponding movement systems extend longitudinally along the direction Ydist so as to enable the movement of the distribution base structure 201 for a length at least equal to that comprised between the base structure 2 and the additional base structure 200 that is furthest from the base structure 2.

The leadscrew racks 500 of all the additional base structures 200 have, at the end facing the distribution base structure 201, leadscrew racks in which the helices have an identical geometry to that of the helices present on the base structure 2, so as to enable the crossmembers 3, 300 to move between one and the next.

The distribution leadscrew rack 501 comprises a respective helical circular toothed sector and is extended along the distribution base structure 201 in a respective longitudinal direction parallel to the first direction X, so as to be capable of being coupled without discontinuities in the helical thread alternatively to the base structure 2 or to the additional base structure 200.

Thus a movement is enabled at least of the first movable crossmember 3 between the base structure 2 and the additional base structure 200 or between additional base structures 200.

The distribution base structure 201 is, in a preferred embodiment, completely similar to the base structure 2 and 200 described previously.

The distribution transverse base structure 211 extends longitudinally in the distribution direction Ydist, parallel to the first direction X of the base structure 2 with a length that can be modulated at will, in a similar manner to the foregoing; to this end in fact the leadscrew racks of the distribution tracks 900 will preferably be made in a similar manner to the leadscrew racks 5, 500 in terms of the threading, so that multiple distribution transverse base structures 211 can be joined together to provide a distribution path that extends in the direction Ydist, the length of which can be determined at will as a function of the operating needs.

Although Ydist is shown in FIG. 20 as a direction that lies substantially on a horizontal plane, it should be understood that its arrangement can (in other configurations, not shown) vary; for example Ydist is a direction that lies substantially on a vertical plane.

Thus the above mentioned objects are achieved.

Naturally, many variations of what is described up to now are possible, all of which should be considered equivalent to what is claimed later.

The content of Italian patent application no. 102016000013699 (UB2016A000624), the priority of which is claimed in the present application, is incorporated as a reference.

Where the technical features mentioned in any claim are followed by reference numerals and/or signs, those reference numerals and/or signs have been included for the sole purpose of increasing the intelligibility of the claims and accordingly, such reference numerals and/or signs do not have any limiting effect on the interpretation of each element identified by way of example by such reference numerals and/or signs.

The invention claimed is:

1. A reconfigurable machining center (1, 100), comprising:
 a first base structure (2), which extends longitudinally in a first direction (X);
 a first movable crossmember (3), which is supported on the base structure (2) so as to be movable with respect to the base structure (2) in the first direction (X) and is provided with a machining head (4),
 a first leadscrew rack (5), integral with the base structure (2) and comprising a first helical circular toothed sector (51), the first leadscrew rack (5) extending along the base structure (2) in a longitudinal direction parallel to the first direction (X) for an entire extension of the base structure in the first direction (X); and
 a first screw (6) rotatably coupled to the first movable crossmember (3) by way of a moving assembly (7), said first screw (6) engaging the first leadscrew rack (5), the screw having a rotation axis parallel to the first direction (X),
 wherein the longitudinal extension of the base structure (2) in the first direction is an integer multiple of a pitch of teeth of the first leadscrew rack (5), and
 wherein the base structure (2) further comprises coupling elements (8) that are adapted to couple the base structure (2) to one or both of a following or preceding adjacent base structure (2'), along the first direction (X).

2. The reconfigurable machining center (1, 100) according to claim 1, wherein:
 the base structure (2) comprises a second leadscrew rack (5) parallel to the first leadscrew rack (5), the second leadscrew rack comprising a second helical circular toothed sector (51) with the same pitch of teeth as the first leadscrew rack or an integer multiple thereof, the second leadscrew rack (5) extending along the base structure (2) in a longitudinal direction parallel to the first direction (X) for the entire extension of the base structure in the first direction (X), and
 the machining center comprises a second screw (6) rotationally coupled to the first movable crossmember (3) by way of the moving assembly (7), said second screw (6) engaging the second leadscrew rack (5), the second screw having a rotation axis parallel to the first direction (X), wherein the first and the second screw (6) define a same pair of screws.

3. The reconfigurable machining center (1, 100) according to claim wherein one or both of said first or said second leadscrew rack (5) support the first movable crossmember (3) on the base structure (2) and enable the first movable crossmember (3) to move along the first direction (X).

4. The reconfigurable machining center (1, 100) according to claim 2, wherein the moving assembly (7) comprises a motor (71) and a transmission shaft (72), wherein the motor (71) and the transmission shaft (72) are common to the first and to the second screw (6) of the same pair, each of the first and the second screws (6) being coupled to said shaft (72), so that the first and the second screws (6) of the same pair rotate synchronously.

5. The reconfigurable machining center (1, 100) according to claim 2, wherein the helical circular toothed sector (51) of one or both of said first or said second leadscrew rack (5) is defined by a center angle of amplitude comprised between 30° and 90°, so that the first or the second leadscrew rack (5) has a function of moving the first movable crossmember (3) with respect to the base structure (2).

6. The reconfigurable machining center (1, 100) according to claim 2, wherein the helical circular toothed sector (51) of one or both of said first or said second leadscrew rack (5) is defined by a center angle of amplitude comprised between 90° and 300°, so that the first the second leadscrew rack (5) has a function of moving and supporting the first movable crossmember (3) with respect to the base structure (2).

7. The reconfigurable machining center (1, 100) according to claim 2, further comprising an additional base structure (2') that extends longitudinally in the first direction (X), further comprising one or both of a first or a second leadscrew rack (5) of the additional base structure, which are integral with the additional base structure (2') and identical to the first or second leadscrew rack (5) of the first base structure (2), wherein the first or the second leadscrew rack (5) of the additional base structure extend along the additional base structure (2') in a longitudinal extension parallel to the first direction (X) for the entire extension of the additional base structure in the first direction (X), wherein the longitudinal extension of the additional base structure (2') in the first direction is a multiple of the pitch of teeth of the leadscrew racks (5) of the additional base structure, and wherein, when the first base structure (2) and the additional base structure (2') are coupled, one or both of the first or second leadscrew rack (5) of the additional base structure are aligned and contiguous with the first or second leadscrew rack (5) of the first base structure (2), so as to enable a modular coupling of a plurality of base structures (2, 2') all extending in the first direction (X).

8. The reconfigurable machining center (1, 100) according to claim 1, further comprising supporting elements that support the first movable cross member (3) on the base structure (2) and enable the first movable cross member to move along the first direction (X), and wherein the supporting elements comprise bearings cooperating with rails.

9. The reconfigurable machining center (1, 100) according to claim 1, wherein the machining head (4) is adapted to move with respect to the first movable crossmember (3) in a second direction (Y), perpendicular to the first direction (X), a first plane on which the first direction (X) and the second direction (Y) lie being a horizontal plane when the machining center (1) is operating.

10. The reconfigurable machining center (1, 100) according to claim 9, wherein the machining head (4) comprises a tool-holder (44) that is adapted to move with respect to a portion of the head (4) in a third direction (Z), perpendicular to said first plane.

11. The reconfigurable machining center (1, 100) according to claim 1, further comprising a workpiece-holding table (10) arranged parallel to the first movable crossmember (3) and supported to move on said base structure (2) along a direction parallel to the first direction (X).

12. The reconfigurable machining center (1, 100) according to claim 11, wherein the base structure (2) comprises a first leadscrew rack (5''') for the workpiece-holding table (10), which first leadscrew rack (5''') for the workpiece-holding table (10) is integral with the base structure (2) and further comprises a first helical circular toothed sector, the first leadscrew rack (5''') for the workpiece-holding table (10) extending along the base structure (2) in a longitudinal direction parallel to the first direction (X) for the entire extension of the base structure in the first direction (X), and wherein the workpiece-holding table (10) comprises a first screw (6''') for the workpiece-holding table (10) rotatably coupled to the workpiece-holding table (10), said first screw (6''') for the workpiece-holding table (10) engaging the corresponding first leadscrew rack (5''') for the workpiece-holding table (10), the first screw (6''') for the workpiece-holding table (10) having a rotation axis parallel to the first direction (X).

13. The reconfigurable machining center (1, 100) according to claim 12, wherein the base structure (2) comprises a second leadscrew rack (5''') for the workpiece-holding table (10), which second leadscrew rack (5''') for the workpiece-holding table (10) is integral with the base structure (2) and further comprises a second helical circular toothed sector, the second leadscrew rack (5''') for the workpiece-holding table (10) extending along the base structure (2) in a longitudinal direction parallel to the first direction (X) for the entire extension of the base structure in the first direction (X), and wherein the workpiece-holding table (10) comprises a second screw (6''') for the workpiece-holding table (10) rotatably coupled to the workpiece-holding table (10) by way of a moving assembly, said second screw (6''') for the workpiece-holding table (10) engaging with the second leadscrew rack (5''') for the workpiece-holding table (10), the second screw (6''') for the workpiece-holding table (10) having a rotation axis parallel to the first direction (X).

14. The reconfigurable machining center (1, 100) according to claim 1, wherein the base structure further contains at least two electric conductors, and the moving assembly (7) comprises sliding contacts.

15. The reconfigurable machining center (1, 100) according to claim 1, further comprising an electromagnetic source for providing an electric power supply of a motor present on the first movable crossmember by way of an electromagnetic field.

16. The reconfigurable machining center (100) according to claim 1, further comprising:
   a second base structure (200) that extends longitudinally in a direction (X') parallel to the first direction (X) of the first base structure (2); and
   a second leadscrew rack (500), integral with the second base structure (200) and comprising a second helical circular toothed sector, the second leadscrew rack (500) extending along the second base structure (200) in a longitudinal direction parallel to the first direction (X) for the entire extension of the second base structure (200) in the direction (X') parallel to the first direction (X), wherein:

a pitch of teeth of the second leadscrew rack (500) of the second base structure (200) is identical to the pitch of the teeth of the first leadscrew rack (5) of the first base structure (2), and the longitudinal extension of the second base structure (200) in the direction (X') parallel to the first direction (X) is an integer multiple of the pitch of the teeth of the second leadscrew (500) rack, the reconfigurable machining center (100) further comprising at least one distribution base structure (201) that is adapted to move with respect to the first base structure (2) in a distribution direction (Ydist), perpendicular to the first direction (X), wherein said distribution base structure (201) extends longitudinally in a direction parallel to the first direction (X) of the first base structure (2), said distribution base structure (201) comprising a distribution leadscrew rack (501) integral with the distribution base structure (201), the distribution leadscrew rack (501) further comprising a helical circular toothed sector, the distribution leadscrew rack (501) extending along the distribution base structure (201) in a longitudinal direction parallel to the first direction (X), so as to be selectively coupled without discontinuities in a helical thread alternatively to the first leadscrew rack (5) of the first base structure (2) or to the second leadscrew rack (500) of the second base structure (200) in order to enable a travel of at least said first movable crossmember (3) between the first base structure (2) and the second base structure (200).

* * * * *